Aug. 22, 1967 R. M. ULRICH 3,336,684
LOAD HANDLING APPARATUS
Original Filed Feb. 19, 1962 17 Sheets-Sheet 6
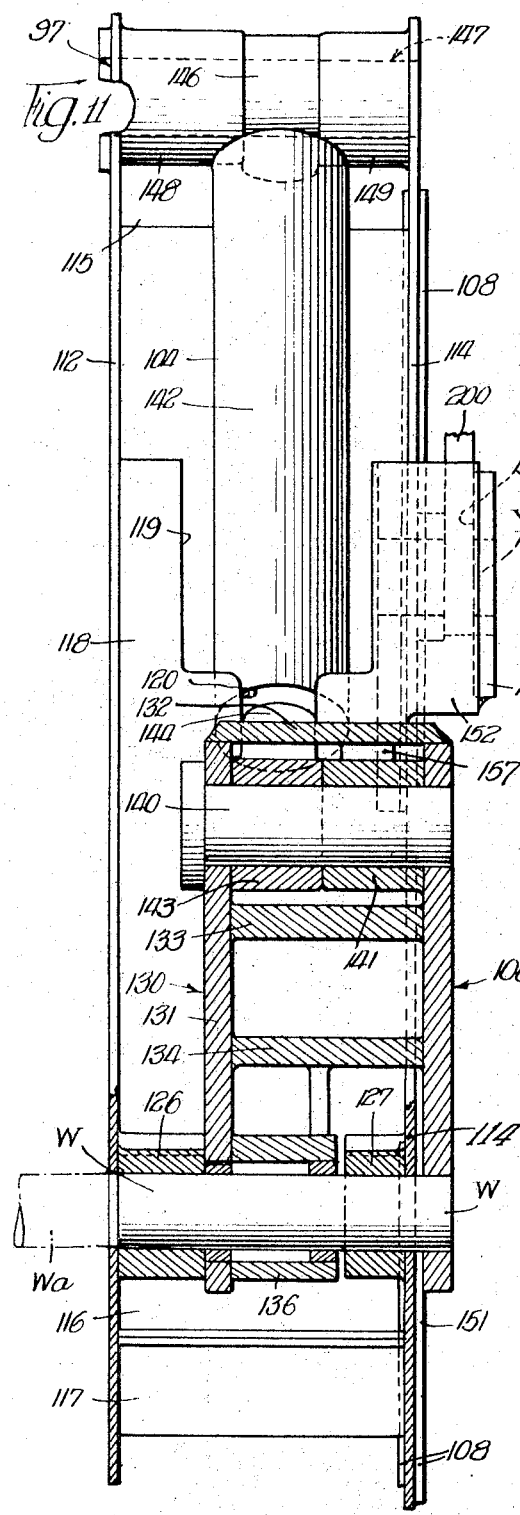
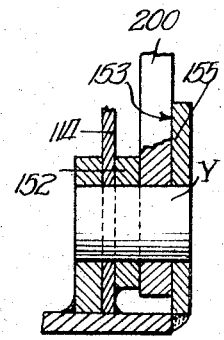
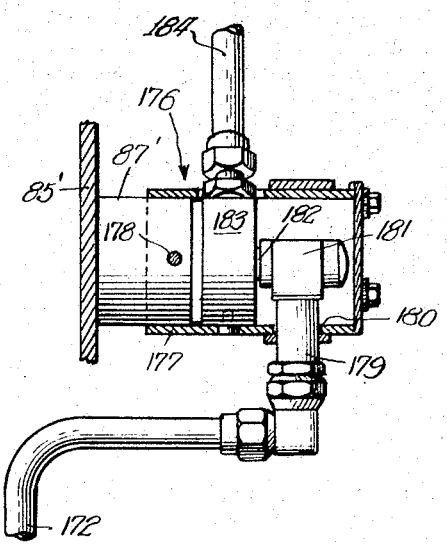
INVENTOR.
Raymond M. Ulrich

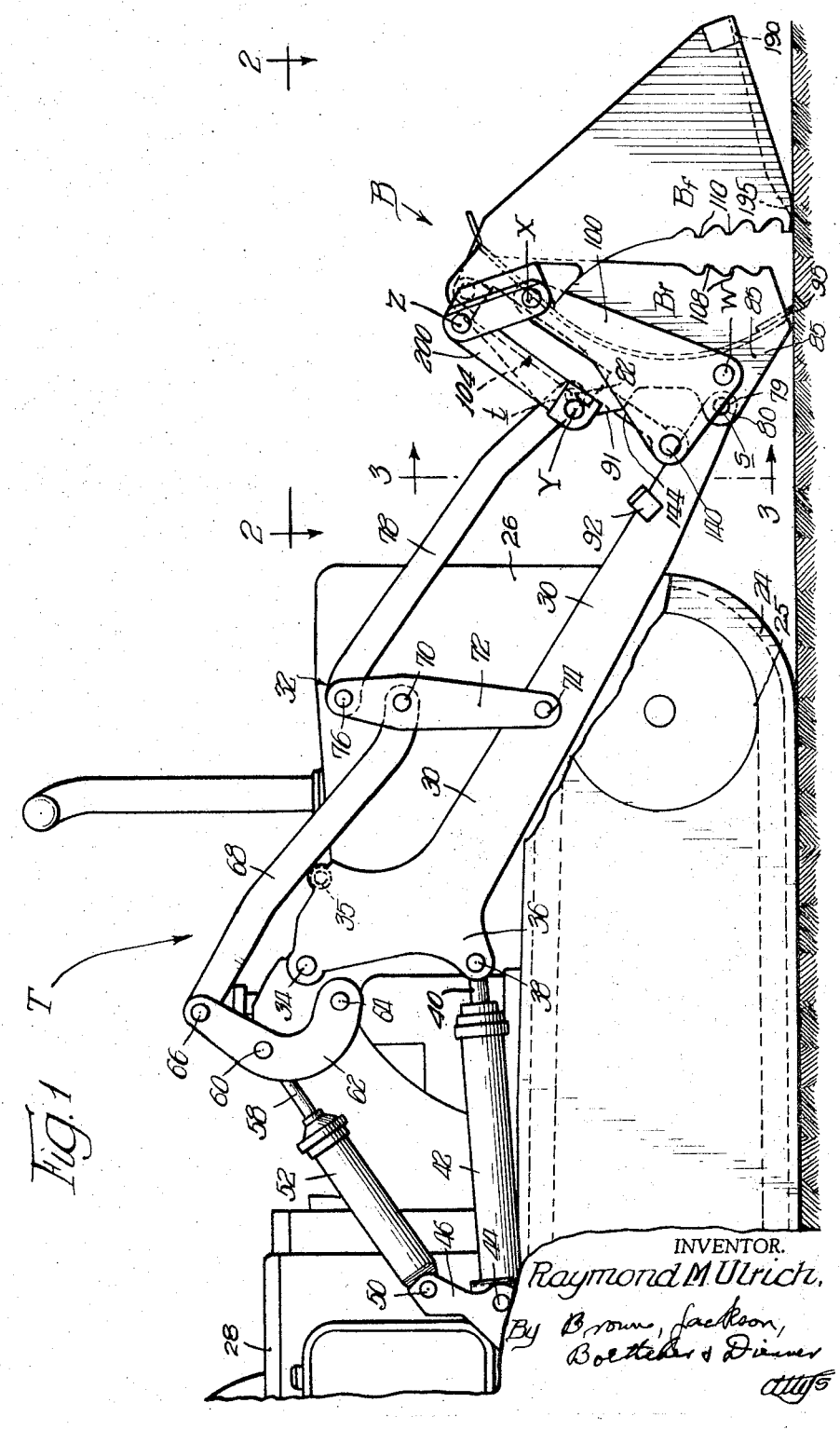

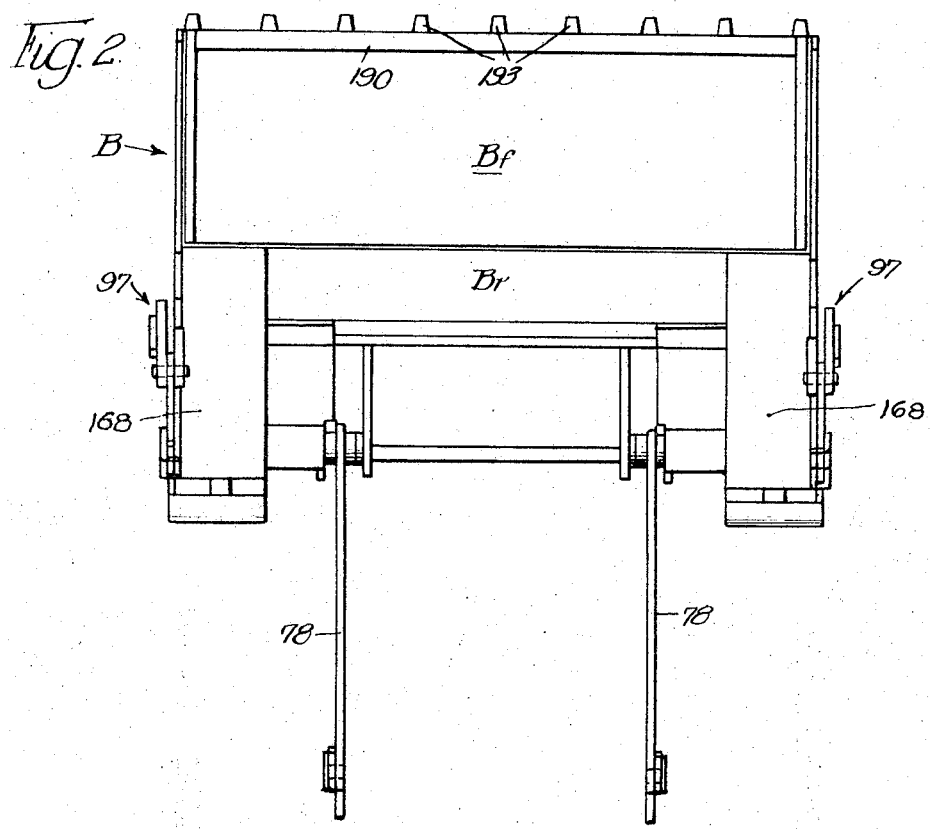
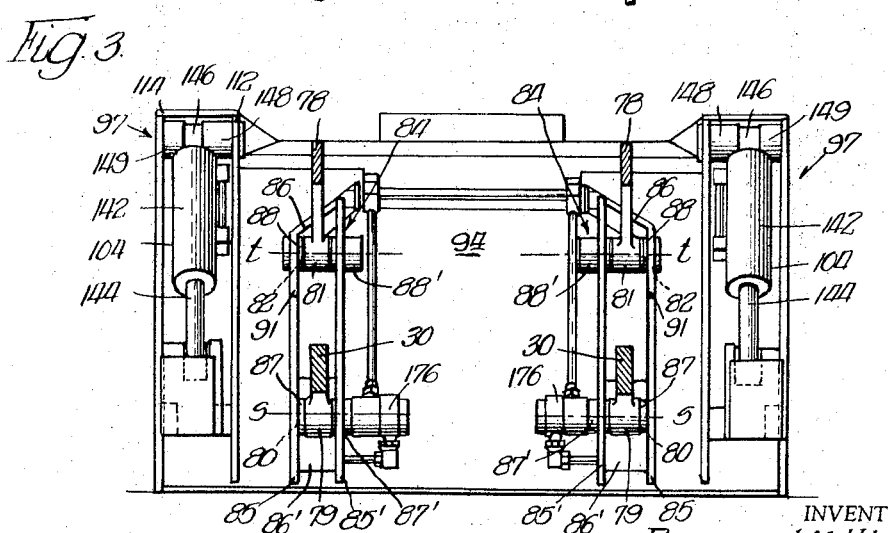

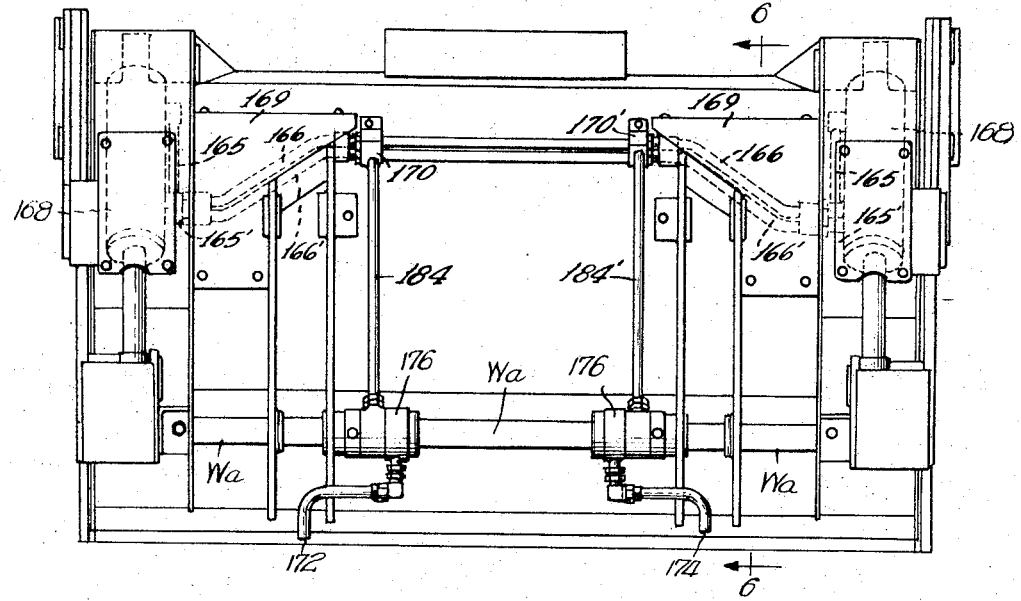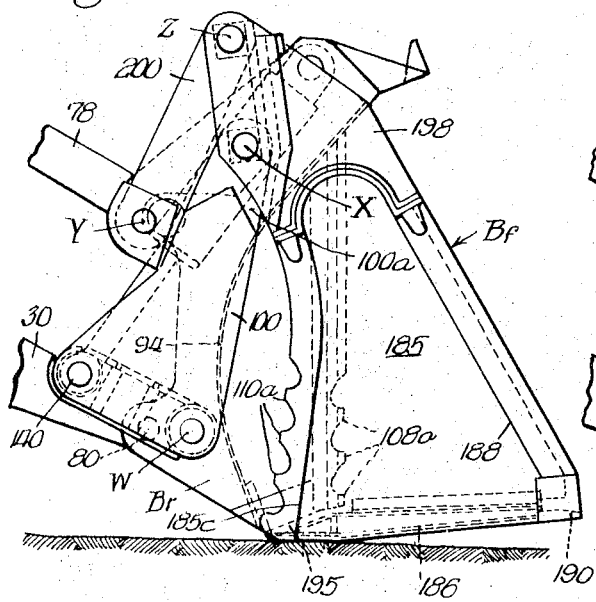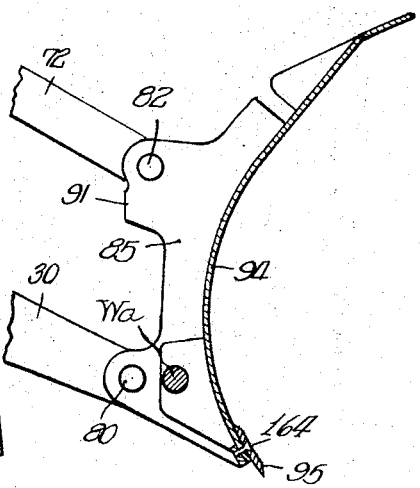

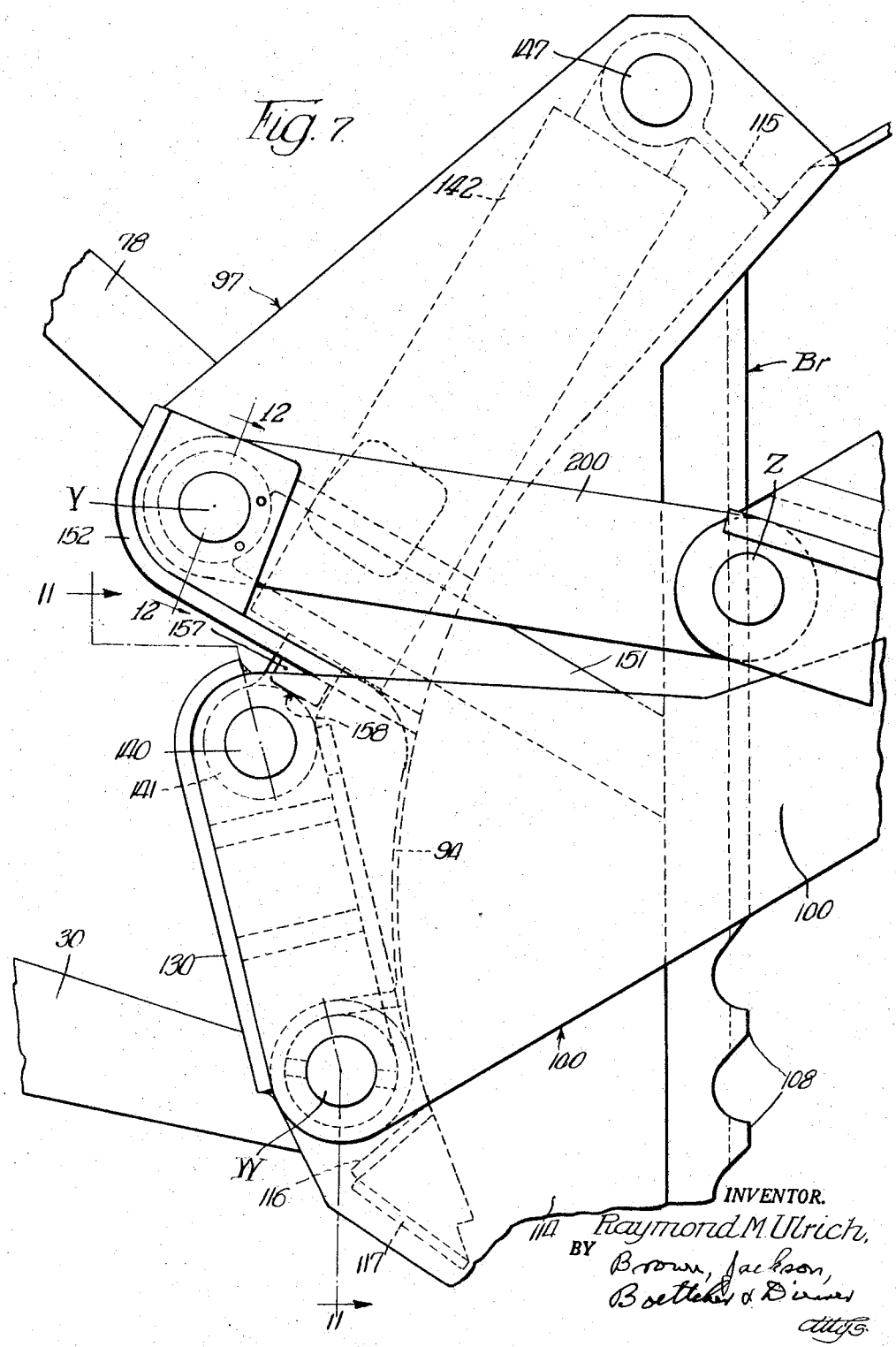

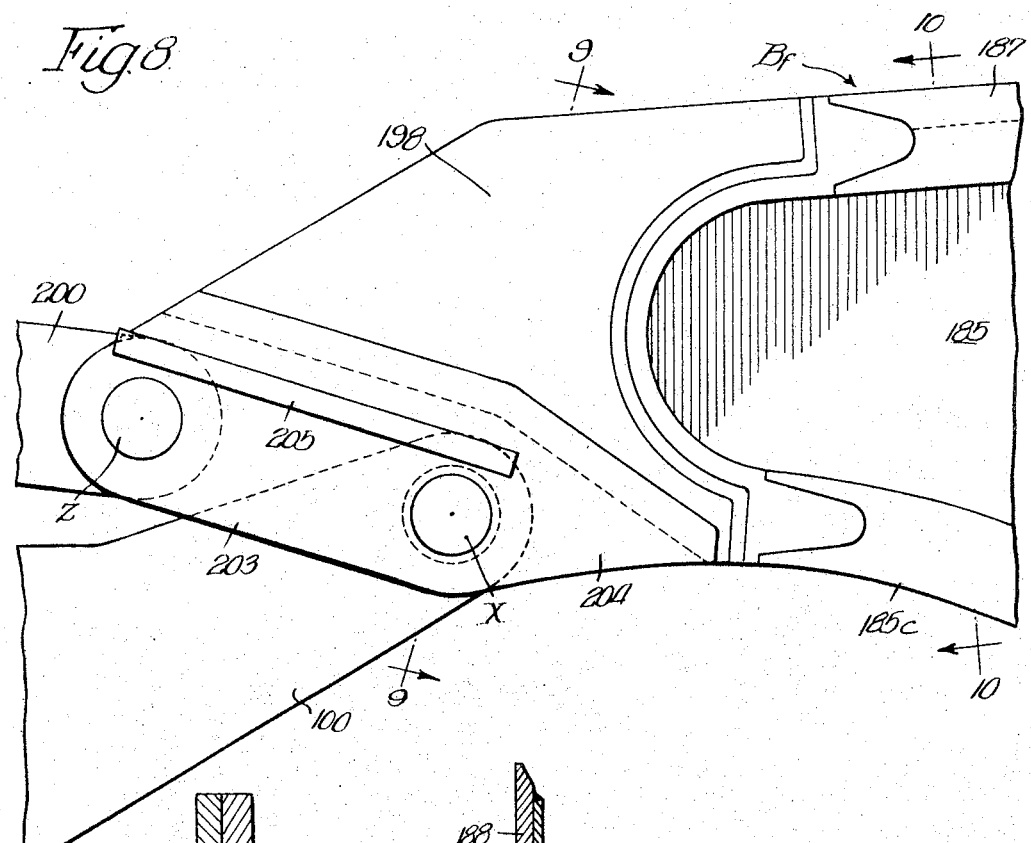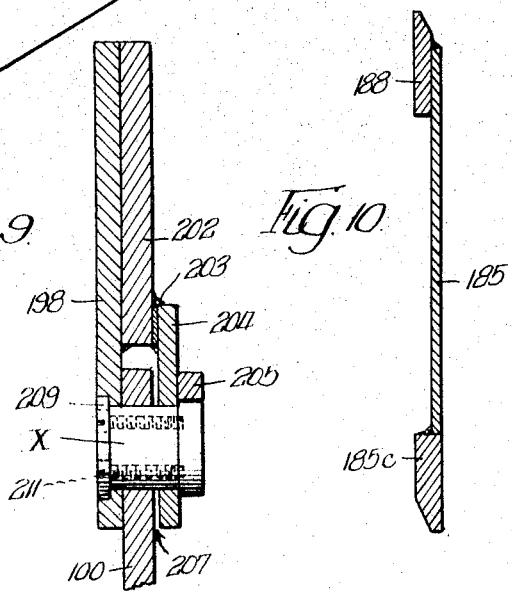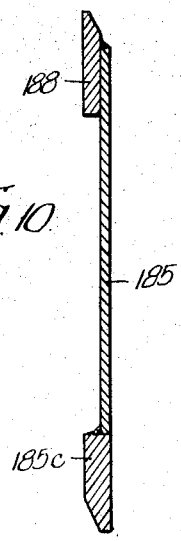

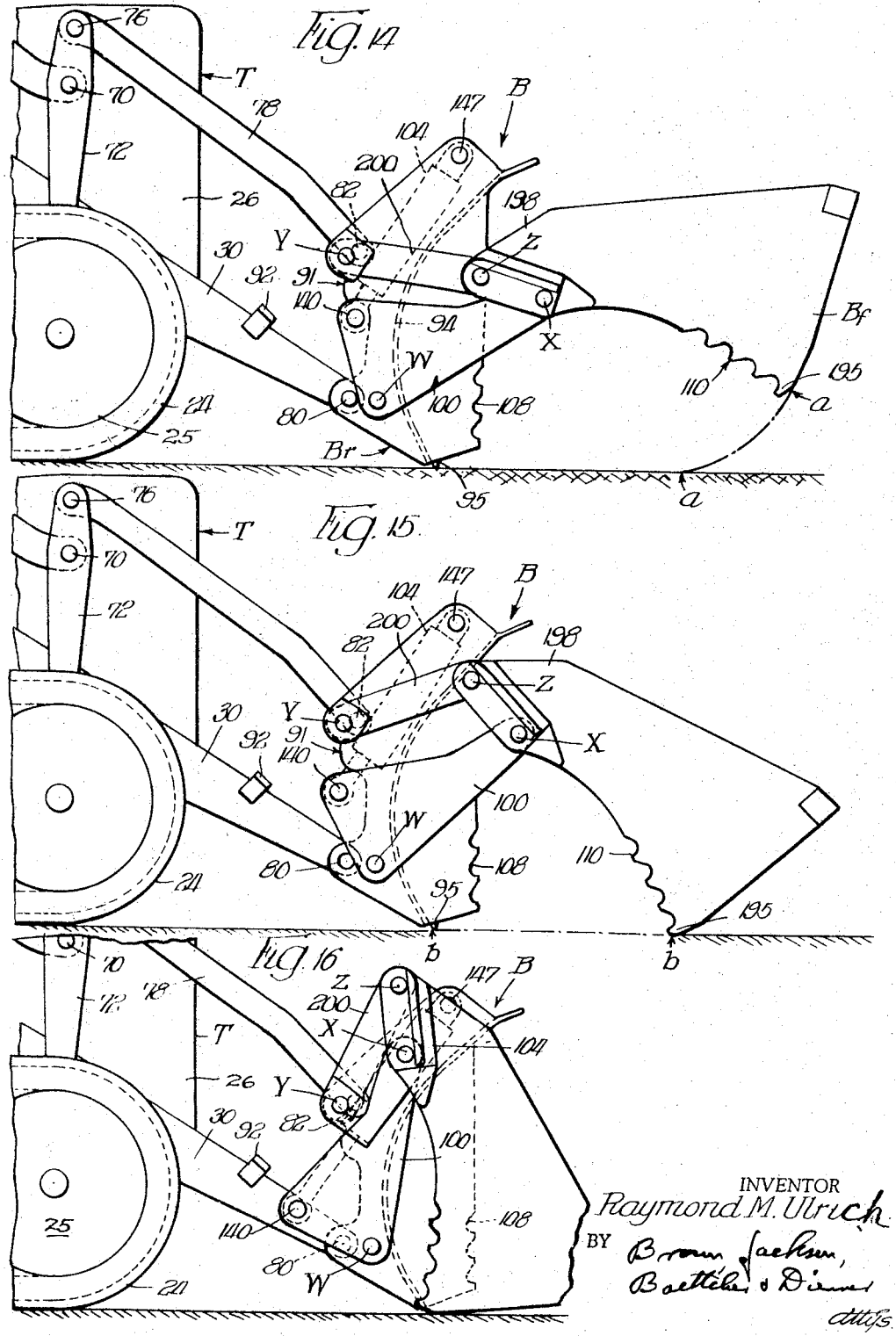

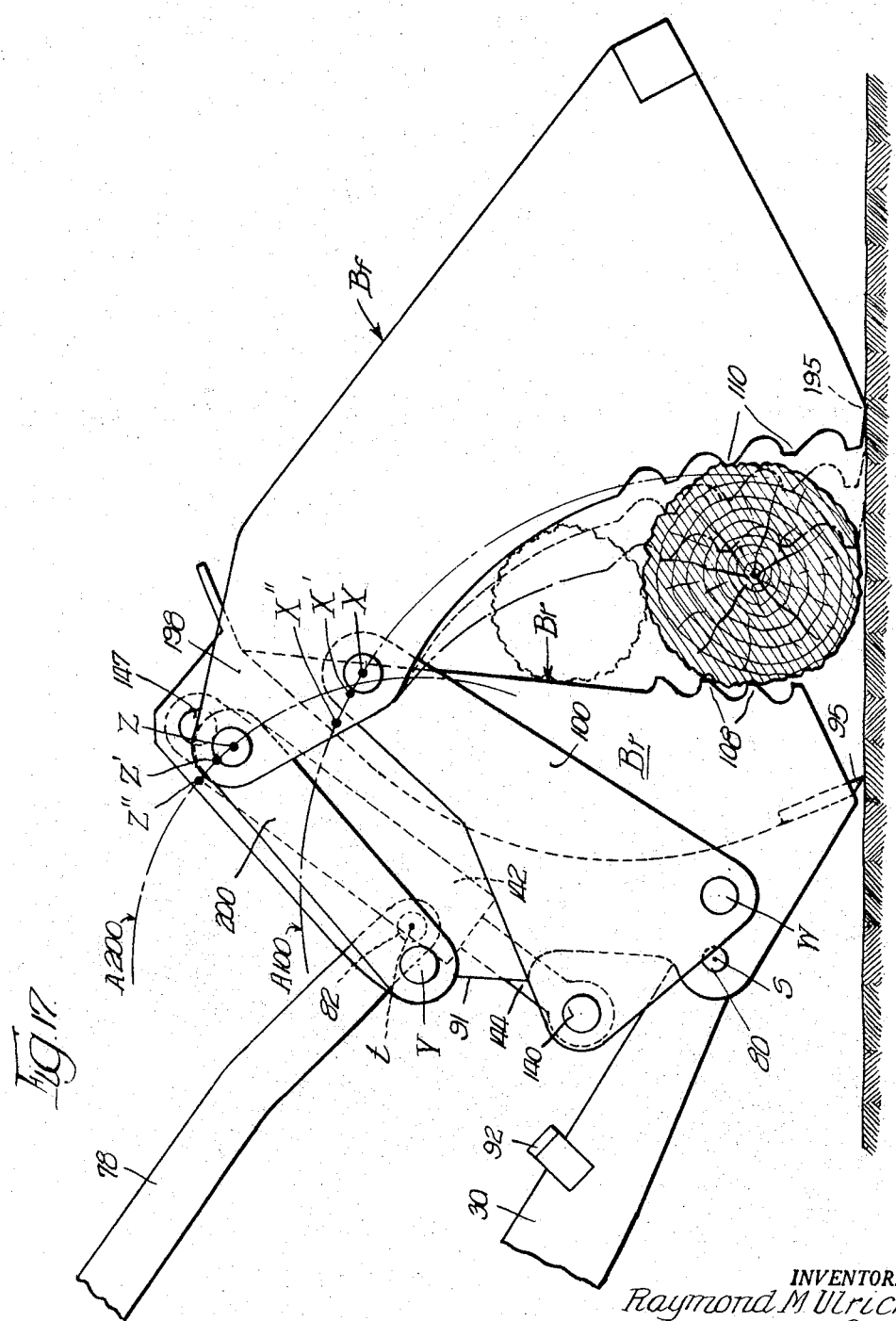

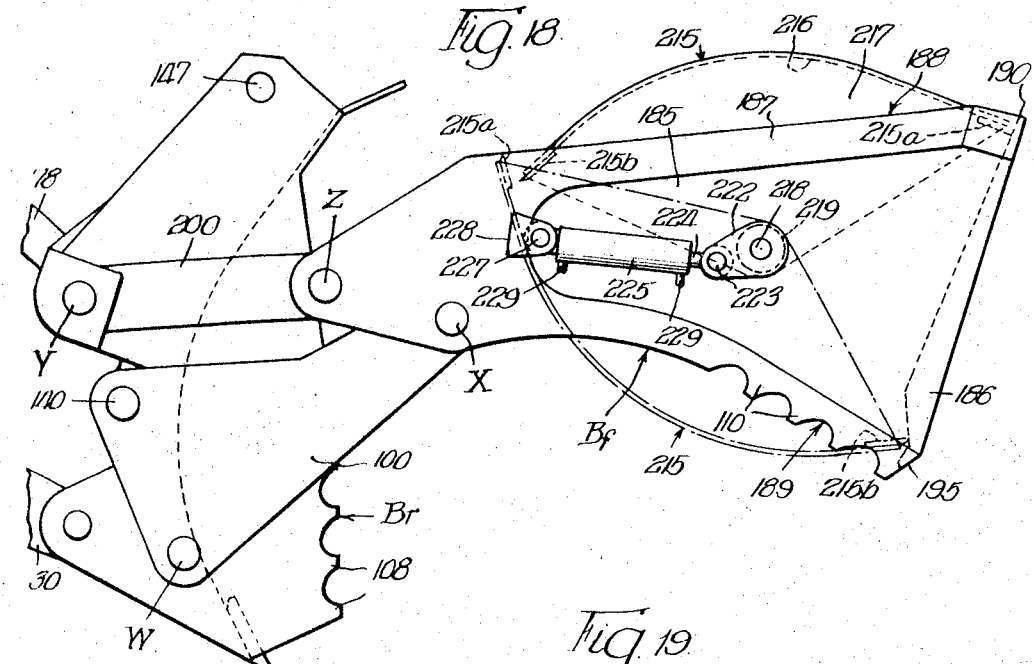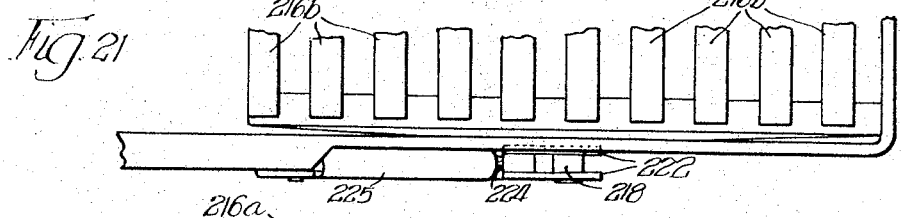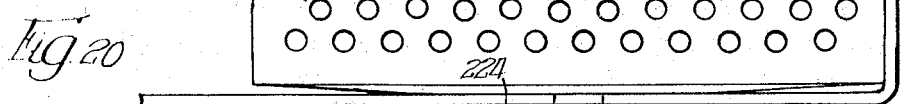

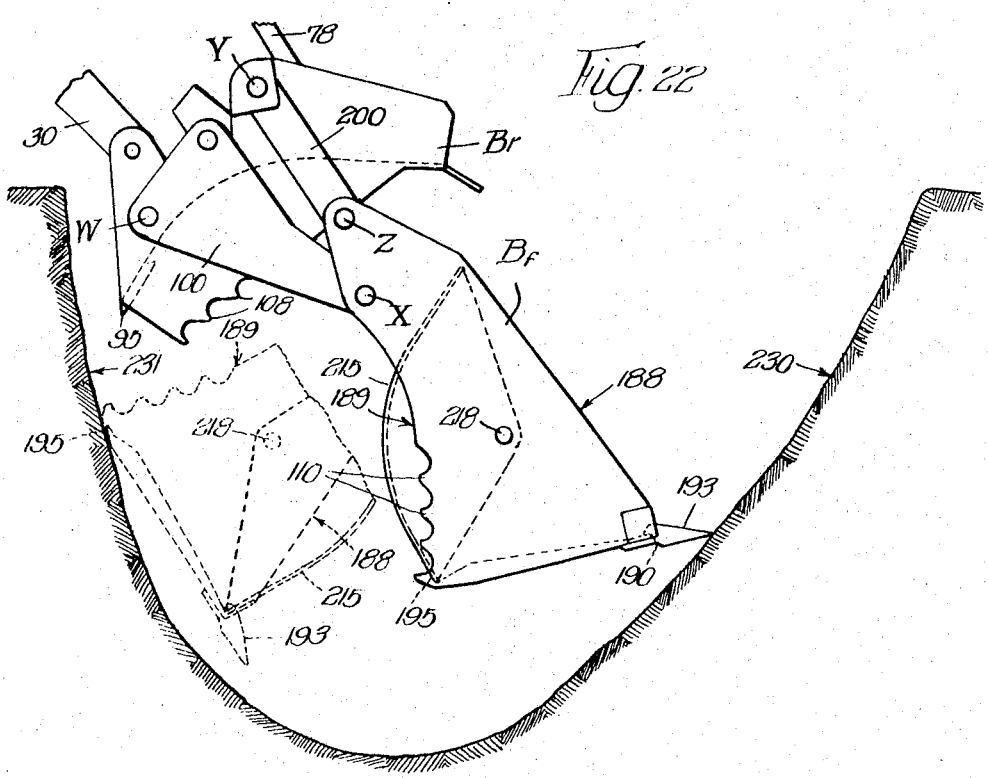

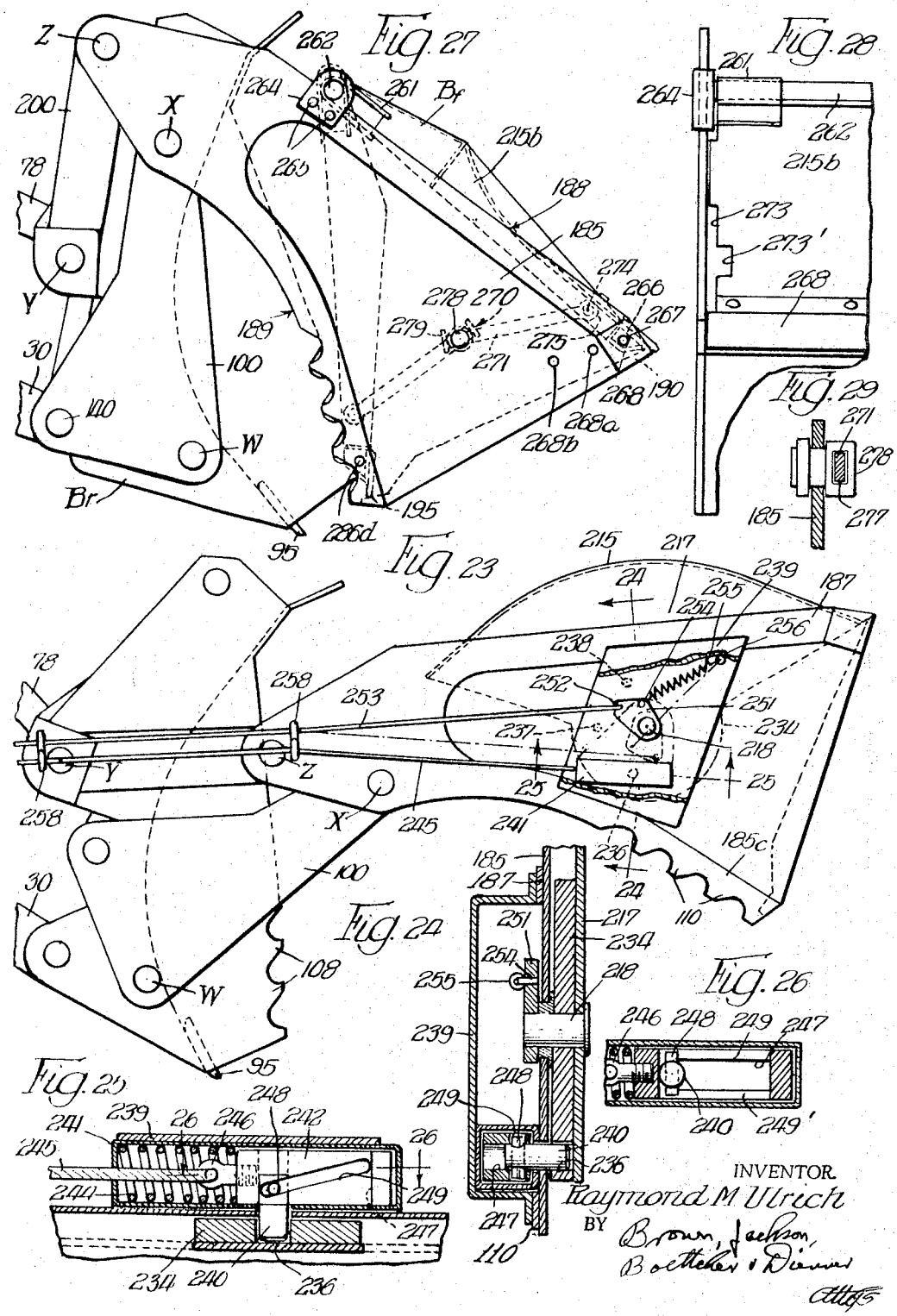

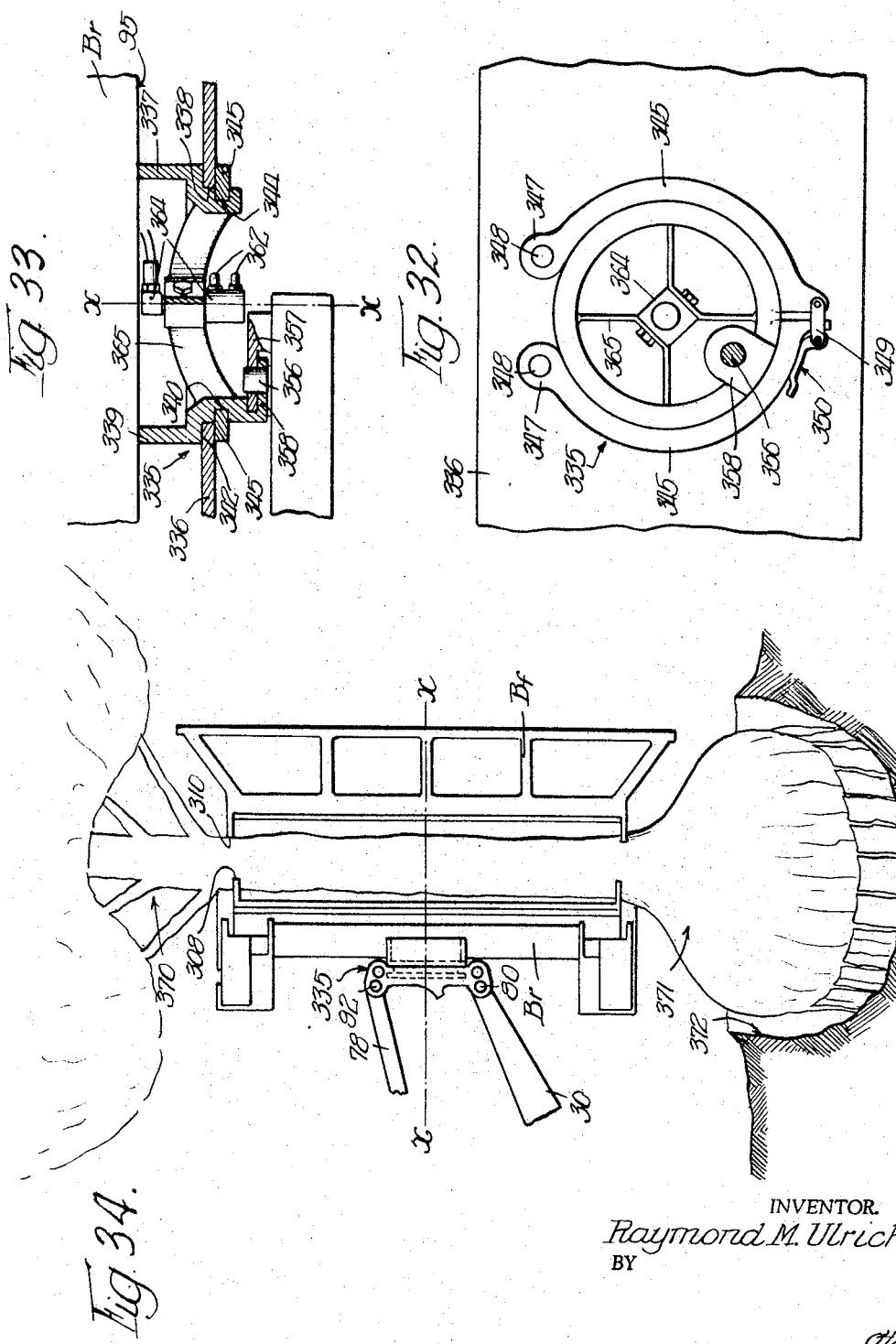

Aug. 22, 1967     R. M. ULRICH     3,336,684
LOAD HANDLING APPARATUS
Original Filed Feb. 19, 1962      17 Sheets-Sheet 14
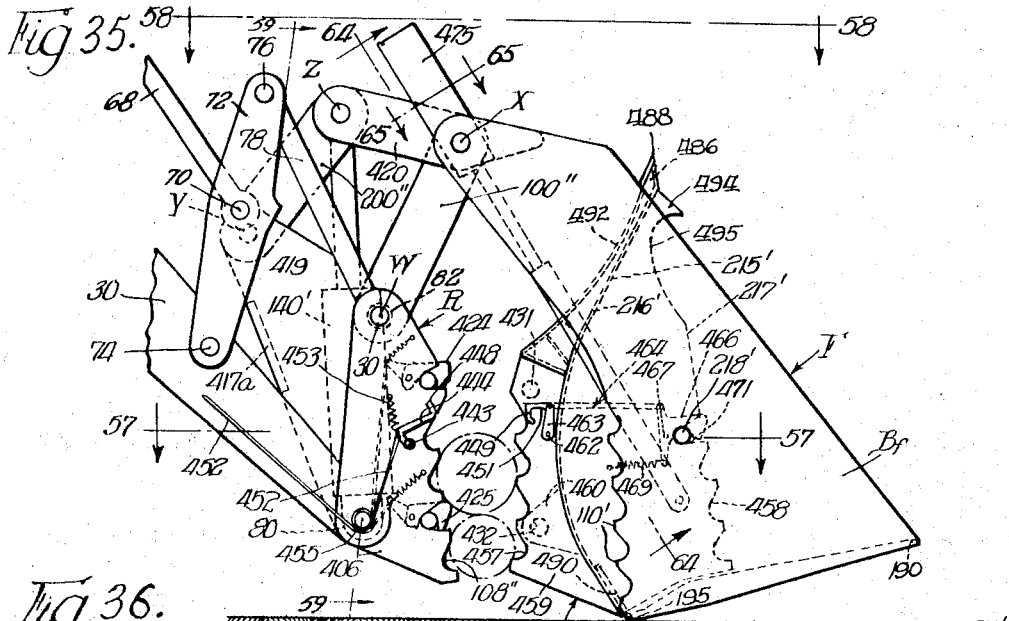
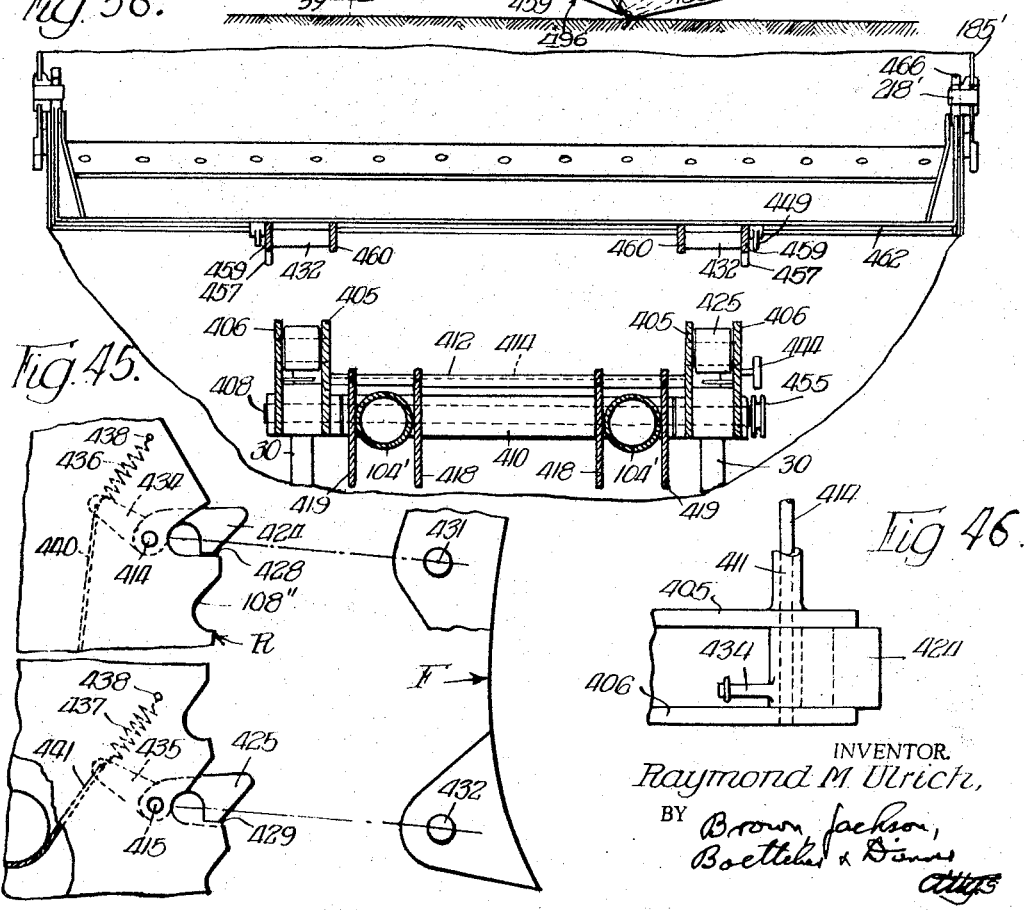
INVENTOR.
Raymond M. Ulrich,
BY Brown Jackson,
Boettcher & Dienner
ATTYS

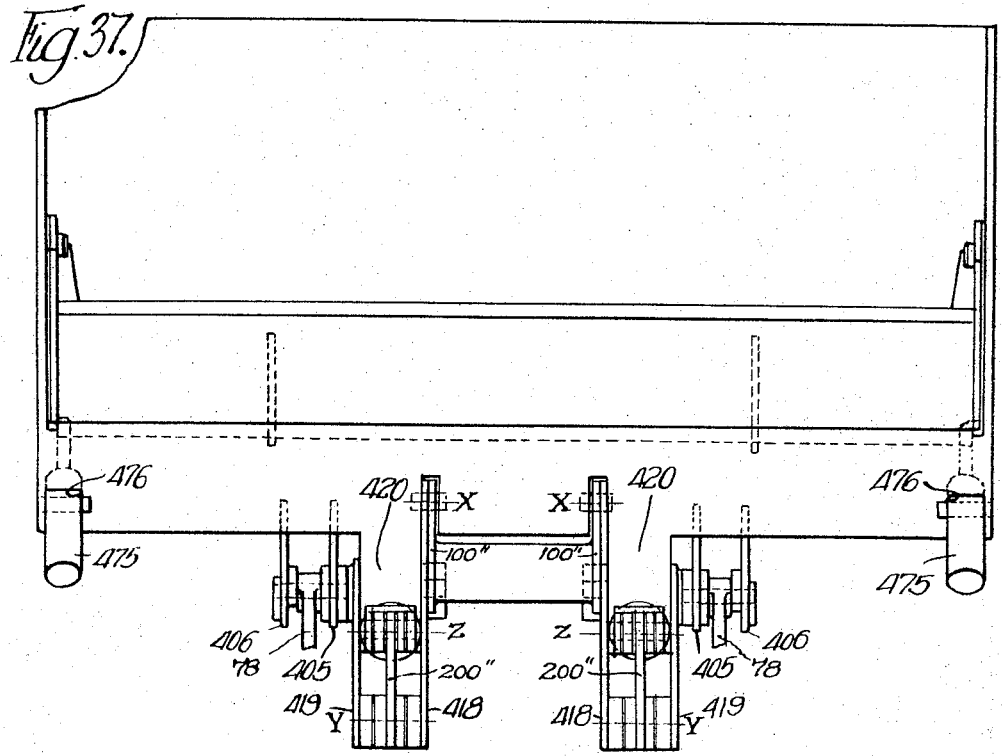
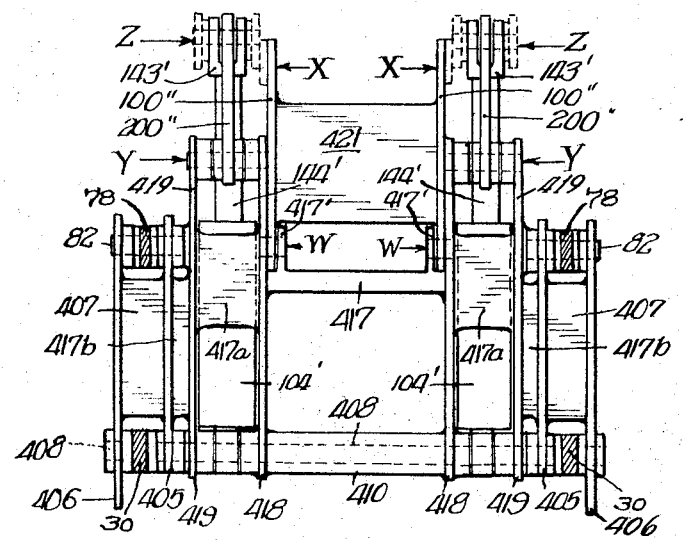

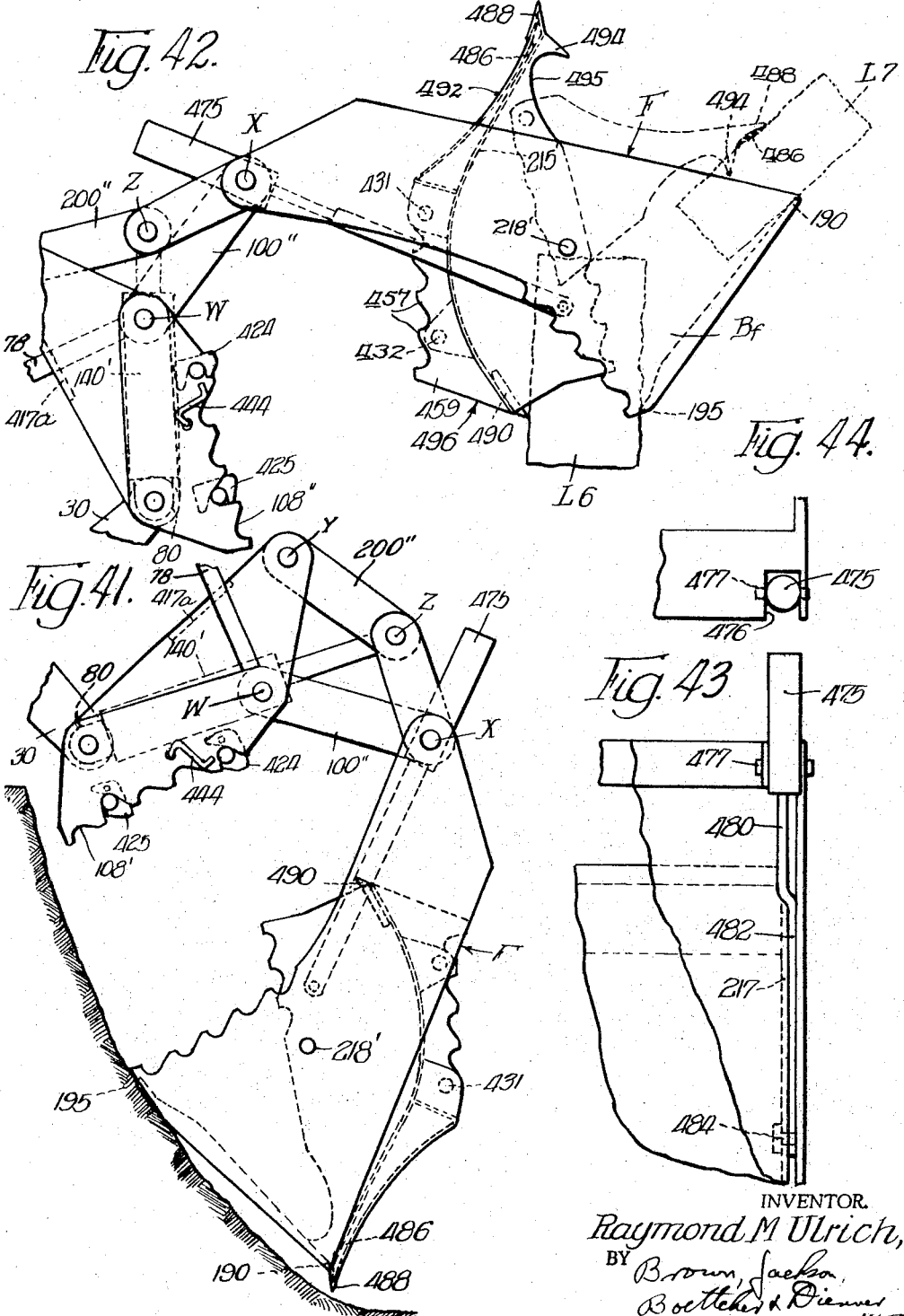

United States Patent Office 3,336,684
Patented Aug. 22, 1967

3,336,684
LOAD HANDLING APPARATUS
Raymond M. Ulrich, Roanoke, Ill., assignor to Ulrich Manufacturing Co., Roanoke, Ill., a corporation of Delaware
Original application Feb. 19, 1962, Ser. No. 174,311, now Patent No. 3,243,905, dated Apr. 5, 1966. Divided and this application Apr. 4, 1966, Ser. No. 539,805
12 Claims. (Cl. 37—117.5)

This application is a division of my copending application, Ser. No. 174,311, filed Feb. 19, 1962, now Patent No. 3,243,905, and relates to an improved load handling apparatus comprising a three element bucket adapted for mounting on a tractor or other self-propelled vehicle.

In said application, Ser. No. 174,311 there is disclosed and claimed a load handling apparatus of the two-section type embodying a front load handling section and a rear load handling section, and one of the principal features of the thus claimed invention resides in the provision of a unique multiple link mounting mechanism between the sections that results in a new and distinctive type of translatory motion between the two sections, comparable to that obtained from a parallel or quadrangular link system.

By virtue of this new and distinctive translatory type or relative motion between the two sections, the apparatus has a new and improved mode of operation when it functions as an earth moving or loading bucket. Still further, this translatory type of relative motion results in the apparatus having a totally new effect when it functions as a grappling device for picking up tree trunks, logs, railroad ties, pipe, structural steel members, etc. This improved grappling effect is also advantageous when the apparatus is functioning as a demolition device for pulling down or breaking up old houses, barns, sheds, etc.

A feature of the presently claimed invention is that a swinging closure gate, preferably in the form of a removable accessory, is adapted for mounting on the front bucket section for converting this front bucket section into a digging and loading unit which can dig and load material entirely independently of the rear bucket section. This is made by the action of the swinging closure gate, which can be caused to swing alternatively into either a front closing position closing the open front of the front bucket section, or into a rear closing position closing the open rear of said section, or into an intermediate position between these two closing positions. Because of the multiple link mounting of the front bucket section on the rear bucket section, it is possible to project the front bucket section into a far-reaching outward position, spaced substantially from the rear bucket section. In this far-reaching outward position, the front bucket section can be dipped down into narrow ditches or moved either upwardly or downwardly along near slopes or far slopes. Heretofore, in such operations, the front bucket section—operating alone—could not be tipped up to a load carrying angle without loss of material either through its open front or its open rear. The provision of the swinging closure gate avoids this difficulty. We have disclosed herein different embodiments of this swinging closure gate, such as a hydraulically operated embodiment, a pull-rope operated embodiment, and an earth impelled embodiment. We have also disclosed a wide range of its potential uses in a further form of the invention provided with only one bucket section, to which reference will now be made.

Another object of the invention is to provide an improved embodiment of the invention characterized by the use of only one bucket section, i.e. wherein this one bucket section corresponds to the front bucket section of the previously described two bucket section embodiments. This one bucket section embodiment is made practical by reason of its utilizing the above described swinging closure gate therein. In this improved embodiment, the swinging closure gate is made to function as a reversible closure member, as a bull-dozing member, as a grading and scraping member, and in other capacities. In this embodiment, there is also provided a rear grappling member having grappling teeth which cooperate with grappling teeth on the swinging closure gate and on the front bucket section, in the performance of different grappling functions.

A further object of the invention is to provide such a bucket assembly which is also so constructed and arranged that the entire bucket assembly can be revolved or swiveled around a fore-and-aft trunnion axis extending substantially longitudinally of the tractor. This enables the bucket assembly to be turned or tilted sidewise either to the right or left, whereby the bucket assembly can be tipped sidewise into a horizontal plane or any intermediate plane, and whereby the front and rear bucket sections can be actuated through their normal tilting and opening and closing movements during such transition from a vertical plane position into a horizontal plane or intermediate plane position, or after the arrival in such horizontal plane position. This tilting or swiveling about a fore-and-aft axis enables the bucket to perform earth moving operations on inclined surfaces, along side-long slopes, to reach in under overhanging formations or structures, or to dump or spill material to the side, etc. However, of perhaps greater importance is the extended utility that this feature gives to the grappling function of the bucket. That is to say, by swiveling the bucket assembly into a substantially horizontal plane position, the toothed grappling jaws on the side meeting edges of the front and rear bucket sections can be closed directly over vertically extending objects, such as tree trunks, fence posts, telephone poles, etc., as for breaking them loose from their anchored positions. Conversely, such tiltable feature of the bucket enables it to also perform the reverse operation of picking up fence posts, telephone poles or trees to be transplanted, and to swing them into upright positions for lowering into previously dug holes.

Other objects, features, and advantages of the invention will appear from the following detailed description of certain preferred embodiments thereof. In the accompanying drawings illustrating such embodiments:

FIGURE 1 is a side elevational view showing the basic form of my improved load handling apparatus mounted upon a crawler tread type of tractor;

FIGURE 2 is a plan view of the improved apparatus corresponding to a view taken on the plane of the line 2—2 of FIGURE 1;

FIGURE 3 is a transverse rear view of the rear bucket section, corresponding to a section taken on the plane of the line 3—3 of FIGURE 1;

Figure 30:
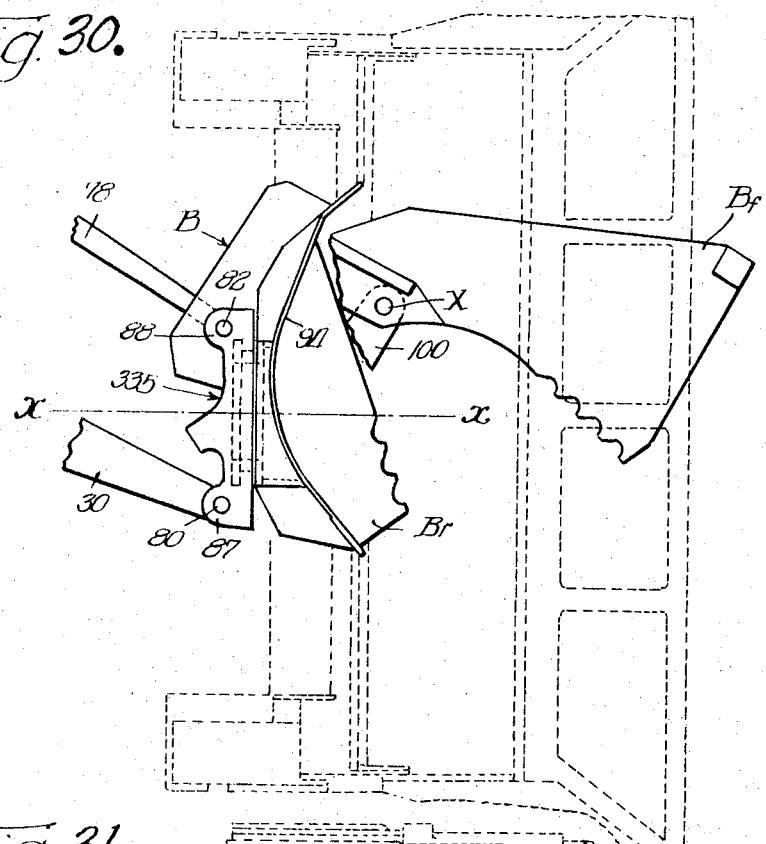
Figure 31:
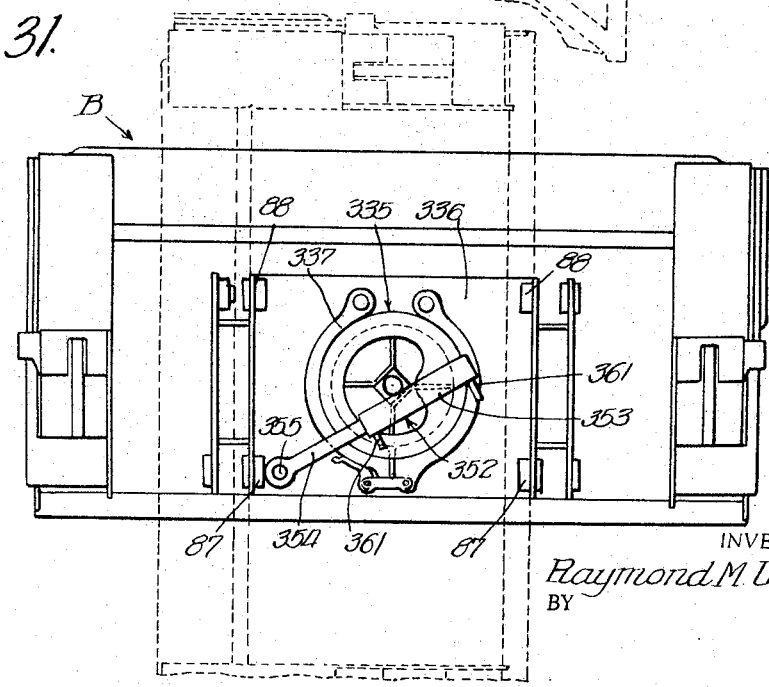

FIGURE 4 is a rear view of the bucket assembly, similar to FIGURE 3, but on a larger scale, showing the bucket prior to the mounting thereof on the lifting and tilting arms, and illustrating the protective housings over the bucket rams, and also the mounting of the hydraulic swivel connections in alignment with the lower mounting pivots between the bucket assembly and the lifting or supporting arms;

FIGURE 5 is a side view of the bucket assembly on the scale shown in FIGURE 4, illustrating the bucket assembly in its completely closed position;

FIGURE 6 is a transverse sectional view taken on the plane of the line 6—6 of FIGURE 4, showing the pivotal mounting of the rear bucket section on the lifting and tilting arms of the tractor;

FIGURE 7 is a fragmentary side elevational view on an enlarged scale, showing the mounting of the rear ends of the guide link and of the power operating link on the hinge bracket of the rear bucket section, corresponding to the extended open position of the bucket shown in FIGURE 14;

FIGURE 8 is an extension or continuation of FIGURE 7, being a fragmentary side elevational view showing the mounting of the front bucket section on the front ends of these links;

FIGURES 9 and 10 are detail transverse sectional views taken on the planes of the lines 9—9 and 10—10 of FIGURE 8;

FIGURE 11 is a rear view showing the mounting of the rear ends of the guide link and of the power operating link in the associated hinge bracket on the rear bucket section, the lower portion of this figure corresponding to a section taken more or less on the plane of the line 11—11 of FIGURE 7;

FIGURE 12 is a detail transverse sectional view taken on the plane of the line 12—12 of FIGURE 11, showing the mounting of the rear end of the upper guide link in the hinge bracket;

FIGURE 13 is a detail sectional view showing the mounting of one of the hydraulic swivel connections in alignment with the associated lower mounting pins which mount the bucket assembly on the lifting arms;

FIGURES 14, 15 and 16 are fragmentary side elevational views, similar to the front part of FIGURE 1, showing the bucket in three successive closing stages of one type of earth moving operation;

FIGURE 17 is a side elevational view of the load handling apparatus on a larger scale, showing the front and rear sections in the performance of a grappling operation, and illustrating the arcs of swing of the mounting links;

FIGURE 18 is a side elevational view showing the front bucket section provided with a hydraulically operated swinging closure gate;

FIGURE 19 is a fragmentary plan view of the right-hand edge of FIGURE 18 on a larger scale;

FIGURES 20 and 21 are views similar to FIGURE 19, showing modified constructions of the closure gate;

FIGURE 22 is a diagrammatic view showing the swinging closure gate of FIGURE 18 in its operations of closing the open back and the open front of the bucket section during trenching or other soil moving operations;

FIGURE 23 is a view similar to FIGURE 18, showing another swinging closure gate, which is pull-cable tripped and pull-cable operated;

FIGURES 24 and 25 are enlarged sectional views taken on the planes of the lines 24—24 and 25—25 of FIGURE 23;

FIGURE 26 is a fragmentary sectional view taken on the plane of the line 26—26 of FIGURE 25;

FIGURE 27 is a side elevational view showing a swinging vane type of closure gate;

FIGURE 28 is a fragmentary front view of such gate;

FIGURE 29 is a fragmentary detail section of one form of stop link mechanism used on such gate;

FIGURE 30 is a diagrammatic side view showing the improved load handling apparatus or bucket mounted on a swivel joint permitting angular swiveling thereof;

FIGURE 31 is a rear elevational view of the bucket and this swivel joint mounting;

FIGURE 32 is a rear elevational view of the swivel joint on a larger scale;

FIGURE 33 is a fragmentary sectional view through the swivel joint;

FIGURE 34 is a diagrammatic view showing how the swivel joint enables the apparatus to operate vertically in uprooting a tree or in planting a tree;

FIGURE 35 is a side elevational view of a modified embodiment of load handling apparatus characterized by only one bucket section (i.e. a front bucket section), this embodiment comprising a rear grappling section, and the aforesaid front bucket section, together with a swinging gate carried by the front bucket section to function as a reversible closure member, as a digging member, as a bull-dozing member, etc.;

FIGURE 36 is a fragmentary sectional view taken on the plane of the line 36—36 of FIGURE 35;

FIGURES 37 and 38 are plan and rear elevational views taken on the planes of the lines 37—37 and 38—38 of FIGURE 36;

FIGURES 39-42 are side elevational views showing different operating relations of the above single bucket section embodiment;

FIGURE 43 is a fragmentary edgewise sectional view taken approximately on the plane of line 43—43 of FIGURE 35;

FIGURE 44 is a detail sectional view taken substantially at right angles to FIGURE 43, and approximately on the plane of the line 44—44 of FIGURE 35;

FIGURE 45 is an enlarged schematic view showing the upper and lower cable tripped latches and latching pins that releasably hold the swinging closure gate latched to the rear grappling section;

FIGURE 46 is a detail plan view of one of these cable tripped latches.

For an understanding of the construction and operation of the subject matter comprising the presently claimed invention, the basic structure to which the invention is adapted is set forth in the parent application, Ser. No. 174,311, as comprising a bucket designated B in its entirety in FIGURE 1 and there shown as mounted on the front end of a crawler tread type of tractor designated T in its entirety. This tractor is preferably of the full crawler type having endless crawler treads 24 traveling over the usual front and rear sprocket wheels and intervening idler rollers associated with the tread frames 25. These treads and tread frames are spaced outwardly from the main frame or body 26 of the tractor to permit the interposition of the bucket lifting arms therebetween. The tractor has any usual or conventional engine power plant and transmission for driving the propelling treads, this power plant also including a high-pressure hydraulic supply system for supplying hydraulic liquids under high pressure to the operating and control cylinders or rams of the bucket and of the tractor. The operator's seat 28, together wtih the control handles for operating the tractor and bucket, are usually located where the operator can have a clear view of the bucket operations without being in a dangerous position with respect to loads raised to high or overhead positions by the bucket. While it is decidedly preferable to mount the bucket on a full crawler tread type of tractor, as shown, nevertheless, it will be understood that the invention can also be utilized to advantage with a bucket mounted on wheeled tractors and on other types of self-propelled power vehicles.

The bucket B is supported at the front end of the tractor T by right and left support arms 30 and by right and left sets of tilting linkage 32, these being disposed on opposite sides of the tractor in the vertical planes of the spaces lying between the tread frames 25 and the tractor body 26. Each of the right and left lifting and lowering arms 30 has fulcrum mounting at its rear end on a transverse pivot pin 34 having fixed axis support on the tractor body or frame 26. Forwardly of the fixed axis fulcrum mounting 34, these two lifting arms 30 are cross connected by a transverse tubular brace bar 35, which compels substantially simultaneous movement of the two lifting arms. Projecting from the underside of each support arm 30 approximately below the fulcrum axis 34 is a clevis-type of pivot log 36 carrying a transverse pivot pin 38 to which the forward end of a piston rod 40 is pivotally connected. This piston rod extends from a two-way hydraulic ram cylinder 42 which is pivotally mounted at its rear end on a pivot pin 44 extending transversely through a mounting bracket 46 carried by the tractor frame 26. Hydraulic lines connect to the opposite ends of the ram cylinder 42 for enabling the ram cylinder to transmit a two-way lifting and lowering motion to the lifting and lowering support arm 30.

Referring now to the bucket tilting linkage 32, the same bracket 46 which carries the pivot pin 44 of the lifting and lowering ram 42 also carries at a higher level another transverse pivot pin 50 to which the rear end of a bucket tilting ram cylinder 52 is pivotally mounted. This is likewise a two-way cylinder having hydraulic lines connected to opposite ends thereof, and the piston rod 58 extending from the front end of the cylinder is pivotally connected at 60 to the intermediate portion of an angle-shaped lever 62, the lower end of which has fulcrum mounting on a transverse pivot pin 64 carried by the tractor body at a point slightly below and to the rear of the fulcrum pin 34 of the lifting and lowering arm 30. The opposite or upper end of the angle-shaped lever 62 has pivotal connection through a clevis mounted pin 66 with the rear end of a push-pull link 68 which extends forwardly directly above the lifting and lowering arm 30. The front end of the push-pull link 68 has pivotal connection at 70 with an intermediate point of an upwardly extending lever 72 which has its lower end pivotally mounted at 74 on the lifting and lowering arm 30. The upper end of the lever 72 is pivotally connected at 76 with another forwardly extending push-pull link 78. The lever 72 is made up of laterally spaced companion parts welded together at intervals by cross struts, whereby the lower portion of the lever has clevis-like spaced side arms embracing opposite sides of the lifting and lowering arm 30 for receiving the pivot pin 74, and whereby the two push-pull links 68 and 78 have clevis pivotal mounting at 70 and 76 between the spaced halves of the lever.

The pair of right and left supporting arms 30, 30 at each side of the tractor T constitute power-operated supporting means operative to support the bucket B and to raise and lower it; and the pair of right and left sets of linkage 32 constitute power-operated tilting mechanism for tilting the bucket B in its entirety relative to the supporting arms 30, 30. Pivot eyes 79 at the ends of the supporting arms 30, 30 mount transverse pivot pins 80 which establish a lower transverse supporting axis s on which the back bucket section is tiltably mounted for fore-and-aft swinging movement, which swinging movement is determined by the push-pull action of the tilting links 78. The ends of these latter links 78 also have pivot eyes 81 secured thereto which mount transverse pivot pins 82 that establish a tilting axis t with the back bucket section at a point substantially above the lower supporting axis s.

It will be evident from the foregoing that the admission of hydraulic pressure to the rear ends of the bucket lifting cylinders 42 will swing the right and left supporting arms 30 upwardly to raise the bucket to an elevated position, as for transporting a load in the bucket to a point of dumping; and it will also be evident that the admission of hydraulic pressure thereafter to the rear ends of the bucket tilting cylinders 52 will operate through the tilting linkage 32 to tilt the bucket in a forward clockwise direction about the lower supporting axis s, as for example to dump the load from the bucket at the point of dumping. During this upward swinging movement of the supporting arms 30, 30 to raise the bucket, the bucket tilting linkage 32 will automatically partake of a certain degree of this upward swinging movement by reason of the pivotal mounting of the intermediate motion-transmitting lever 72 at the pivot 74 on the supporting arm 30, and also by reason of the relatively close proximity of the tilting linkage fulcrum center 64 to the lifting arm fulcrum center 34. This insures that in the operation of raising a loaded bucket to an elevated position, either for transport or for dumping, the bucket will not accidentally be tilted to an angle where part or all of its load might be prematurely dumped accidentally, as will be disclosed in greater detail after the following description of the two bucket sections and their multiple link connecting mechanism.

The right and left supporting pins 80, 80, and the right and left tilting pins 82, 82 have vertically spaced mounting in right and left hinge brackets 84, 84 (see FIGURES 3 and 4) which have welded attachment to the curved back-surface of the rear bucket section, designated Br. Each hinge bracket 84 is made up of a pair of spaced side plates 85, 85' which are cross-braced by transverse reinforcing braces 86, 86' welded to the upper and lower portions of the side plates. The supporting arms 30 and the tilting arms 78 extend into the clevis-like spaces between these side plates where they receive the supporting pins 80 and the tilting pins 82, which pass through aligned pairs of pivot bosses 87, 87' and 88, 88' welded to the bracket side plates. The outermost side plate 85 of each bracket 84 is formed with a rearwardly projecting lug 91 located near the upper pivot boss 88 which is adapted to function as an abutment stop for abutting engagement against a corresponding stop bracket 92 welded to the upper edge of the adjacent supporting arm 30. The engagement between the stop surfaces 91 and 92 limits the rearward tilting (counterclockwise) of the bucket around the supporting pins 80, particularly when a loaded bucket is swung upwardly toward or into its position of maximum elevation. The front edges of the bracket plates 85, 85' are of concave curvature for welding to the convex rear surface of the large curved plate 94 which makes up the back wall of the rear bucket section Br. This back wall 94 carries a transverse cutting bit 95 across its lower edge.

Also secured to the convexly curved back surface of the rear bucket section Br, at points located outwardly beyond the hinge brackets 84, 84, are multi-purpose bracket structures 97, 97, welded to the lower corners or lower edge of this back plate, along the right and left side edges of such plate. These bracket structures 97 perform the multiple functions of: (a) mounting the connecting links 100 and 200 extending between the two bucket sections; (b) mounting on the rear bucket section the hydraulic rams 104 which open and close the bucket; and (c) also mounting on the rear bucket section, along the right and left forward edges thereof, the toothed grappling jaws 108 which co-operate with related grappling jaws 110 extending down along the rearwardly facing edges of the front bucket section Bf.

The details of the right-hand bracket structure 97 are best shown in FIGURES 7 and 11, in which figures the two mounting links 100 and 200 are illustrated approximately in the wide open bucket position shown in FIGURE 14. Each of these bracket structures 97 comprises a pair of laterally spaced inner and outer plates 112, 114 which are cross-braced at top and bottom by transverse reinforcing plates or braces 115, 116 and 117, and which have their intermediate portions cross-braced by plates 118 provided with vertical notches or recesses 119 extending down from their upper edges.

The forward edge of the inner bracket plate 112 is formed with a concave curvature for welding to the convex back surface of the rear bucket plate 94. On the other hand, the outer bracket plate 114 extends in forwardly overlapping relation beyond the end of the bucket plate 94 and has a substantially straight front edge to which is welded the toothed grappling jaw 108.

Referring particularly to FIGURE 11, it will be seen that extending transversely through the lower portion of each bracket structure 97 is a pin W which functions as the fulcrum mounting for the lower power operated link 100. This pin W is mounted in spaced bosses 126, 127 which are welded to the opposing inner surfaces of the bracket plates 112, 114. If desired, this fulcrum pin W can be anchored against endwise displacement by transverse pinning through the inner boss 126. Also, if desired, these two pivot pins W at opposite sides of the bucket may consist of the opposite ends of a solid through-shaft Wa which is rotatably mounted in the bearing bosses 126–127 so as to compel simultaneous operation of the mounting links 100 at the opposite sides of the bucket (FIGURES 4 and 5).

Mounted on the fulcrum pin W is a welded assembly in the form of a combined hub and crank structure 130 which establishes the fulcrum mounting of the power operated link 100, and which also establishes the crank pin connection between this link and the associated hydraulic ram 104. This hub and crank structure 130 comprises an inner plate 131 which is spaced inwardly from the crank arm portion of the power link 100 and is cross connected thereto by welded transverse braces 132–134. Welded to the lower end of the inner plate 131 is a mounting sleeve or hub 136 which has rotative mounting on the fulcrum pin 124W between the bosses 125 and 126.

Extending transversely through the upper or outer portion of the hub-crank structure 130 is a crank pin 140 which establishes the power transmitting connection between the associated hydraulic ram 104 and the fulcrum mounting W of the front or lower link 100. This crank pin 140 passes through an aperture in the inner plate 131 and in to a boss 141 welded to the inner face of the power link crank portion. Rotatably mounted on the intermediate portion of the crank pin 140 is the pivot eye 143 provided at the lower end of the hydraulic ram piston rod 144. In the stroking of the ram, the piston rod 144 moves up and down within the narrow portion 120 of the notch-like recess in cross brace 118, the upper wide portion 119 of this recess accommodating the larger diameter of the ram cylinder 142. The upper end of the cylinder 142 has a pivot eye 146 which has pivotal mounting on an upper transverse pin 147 extending through spaced pivot bosses 148, 149 welded to the upper corners of the bracket plates 112, 114. The hydraulic connections to the cylinder 142 will be later described.

Directly outside of the outer bracket plate 114, the lower power link 100 has welded thereto an outwardly offset extension arm 100a which has its outer end operatively connected with the front bucket section Bf through a mounting pin X, as will be later described. Welded to the outer surface of the outer bracket plate 114 is a wear strip or plate 151 over which the inner surface of the power link 100 can have sliding contact in its operation of opening and closing the bucket.

Referring now to the mounting of each upper guide link 200 on the rear bucket section Br, it will be seen from FIGURES 11 and 12 that the intermediate cross brace 118 is constructed in the form of a casting provided with a pintle mounting hub portion 152 which projects outwardly beyond the side plane of the outer bracket plate 114. This hub portion is formed with a vertical pivoting pocket or slot 153 which is closed off on the outer side by an outwardly spaced closure plate 155 that is welded to the hub portion along the rear and bottom sides thereof, leaving the front and top sides of the pocket open. Into this vertical pivoting pocket or slot 153 extends the apertured rear end of the upper guide link 200. Aligned apertures are formed in the hub 152 and in the outer closure plate 155 for receiving a transverse mounting pin Y passing through the mounting aperture formed in this end of the guide link 200. As previously described, the swinging outer end of the lower power operated link 100 has welded to the outer side thereof an offset extension arm 100a which effects the mounting of the pin X, this outwardly offset extension swinging substantially in the vertical plane of the upper guide link 200. The front or outer end of this upper guide link 200 is operatively connected with the front bucket section Bf through a mounting pin Z, which will be later described. Welded to or formed integral with the underside of the hub bracket 152 is a downwardly projecting stationary stop lug 157 (FIGURE 7), against which is adapted to strike the top surface 158 of boss 141 on the crank pin 140 of the hydraulic ram. The outward swing of the front bucket section Bf is limited by the engagement of these stop surfaces 157–158.

As shown in the detailed sectional view of FIGURE 11, each of the toothed grappling jaws 108 carried by the rear bucket section is substantially thicker than the outer side plate bracket 114, with the forward edge of this bracket side plate welded substantially medially of the thickness of the grappling jaw bar 108. The inner vertical surface of the toothed bar is sloped to provide a beveled surface along the inner side of the grappling jaw 108, whereby to avoid edge-to-edge abutment of the front and rear grappling jaws as the bucket is moved to closed position. Extending transversely across the forward bottom edge of the curved back plate 94 of the rear bucket section Br are one or more cutting bit edges 95. These cutting bits are removably secured to the lower edge of the bucket section by bolts 164, so as to be readily replaceable and also reversible, whereby to present unworn cutting bit edges along this forward bottom edge.

Protective shrouding may be provided for the hydraulic ram cylinder 142 and piston rod 144, and also for the hydraulic lines connecting with the upper and lower ends of the cylinder, this protective shrouding preferably being in the form of a sheet metal cover or guard 168 which is secured to the back side of the rear bucket section Br, and which extends rearwardly across the top of the cylinder and thence downwardly along the back side of the cylinder. This shrouding prevents tree branches, stones, and other debris from falling into positions where they would interfere with the action of the hydraulic rams. Referring to FIGURE 13, the two hydraulic lines 172, 174 extending from the source of hydraulic pressure on the tractor T have connection with two fluid transmitting swivel unions or rotative coupling joints 176 which are secured to the back side of the rear bucket section. These swivel unions each comprise a cylindrical shell 177 which has bolted attachment at 178 to the end of the adjacent pivot boss 87' in which the inner end of the bucket supporting pivot pin 80 is mounted. The hydraulic line 172 has a coupling stud 179 which enters the outer end of the shell 177 through an arcuate slot 180 that permits rotative movement of the shell 177 relative to the line 172 and stud 179. The stud 179 connects laterally with a rotary seal housing 181 within which axially enters a rotatable stem 182 projecting from a cored collar 183 fastened in the shell. Sealing rings between the stem 182 and housing 181 hold the hydraulic pressures, and extending from the cored collars 183 of the two unions 176 are rigid metallic pipes 184, 184, one of which has manifold connection with the upper ends of both ram cylinders 142, and the other of which has manifold connection with the lower ends of said cylinders. It will be seen from the foregoing that the axes of these two swivel unions 176 are in alignment with each other and with the axes of the two laterally spaced bucket supporting pins 80 which mount the bucket on the lifting arms 30. Thus, all of the back and forth tilting movement of the bucket around the pivot pins 80 is accommodated in the swivel unions 176, so that there is no necessity of employing flexible hose lines on this exposed portion of the back side of the bucket, where flexible hose lines are susceptible to breakage and tearing loose from their end connections under the destructive action of the debris in which the shovel may be operating.

Referring now to the construction of the front bucket section Bf, the principle structural elements thereof comprise two vertical side walls 185, which are joined together across their bottoms by a transverse bottom wall 186, all being composed of heavy plate stock. This front bucket section has a completely open front 188 and a completely open back 189 between the vertical side walls 185. Each side wall 185 may be formed with a straight line outer edge and a straight line bottom edge, but the inner gripping edge thereof is formed with a long, sweeping curve 185c for mounting the curved inner grappling jaw 110 carried by the front bucket section. The straight line outer and bottom edges of each side wall are strengthened by heavy reinforcing bars 187 welded to these edges, and the curved inner edges 185c are strengthened by the grappling jaw bars 110.

Extending crosswise of the front of the bucket, along the front or leading edge of the bottom bucket wall 186, is a heavy cutting bit 190, which is either welded to the bottom bucket wall or is bolted thereto for reversal or replacement. If the bucket is to be used under certain operating conditions such as in extremely rocky country, this front cutting bit 190 may be either substituted by or supplemented with heavy rock breaking teeth 193, shown in FIGURE 2. Also extending crosswise of this front bucket section, along the rear edge of its bottom plate 186, is another heavy cutting bit 195, which may be either bolted or welded to the edge of the bottom plate 186. This second cutting bit enables the rear edge of the front bucket section to break up soil, pick up soil, etc., in the performance of certain bucket operations to be later described. This bottom bucket plate 186 may be arched upwardly intermediate its front and rear edges to accommodate bracing or trussing welded to its underside.

The curved grappling jaw 110 mounted along each rear edge of the front bucket section, has its radius of curvature and the teeth formed therein so constructed as to exert an embracing or inward rolling action on transverse objects encountered during the initial part of the closing motion of the bucket, this rolling movement being followed by the substantially parallel jaw movement inherent between the front and rear jaws 110 and 108 in the final closing motion of the bucket. It will be noted that the teeth 108a and 110a, by reason of their upward sloping angles, having a ratcheting or snubbing action on round objects, tending to hold them in progressively higher positions between the jaws. As shown in FIGURES 1 and 5, the front and rear sets of teeth move into complete meshing relation when the bucket is substantially closed.

Referring now to the mounting of the front bucket section Bf on the mounting links, it will be seen that welded to each upper corner of the front bucket section, at the apex of the front reinforcing bar 188 and grappling jar bar 110, is a plate in the from of a bucket extension arm 198 (FIGURES 5 and 8). Formed along the back edge of this upper extension arm 198 is a clevis assembly which carries the two pins X and Z that mount the front bucket section on the upper and lower mounting links 100 and 200. This clevis assembly, the details of which are best shown in FIGURES 8 and 9, comprises the extension arm side plate 198, a spacer plate 202, a shim plate 203, an outer plate 204, and a wear bar 205, all welded together around their edges, as shown. The extension arm side plate 198 has an extensive area of welded attachment to the bucket side wall. The outer plate 204 is spaced from the arm side plate 198 by the spacer plate 202 and shim plate 203 so as to define between the outer and inner plates a relatively long civic slot 207 which opens generally downwardly along the rear edge of the clevis assembly. The aforementioned mounting link pins X and Z pass transversely through this clevis slot 207 at points spaced a substantial distance apart so as to accommodate relatively close folding movement of the two mounting links 100 and 200 into substantially parallel edge-to-edge contact in some of the operating positions of the bucket, corresponding approximately to the positions of maximum closure of the bucket sections (FIGURES 5 and 16). The mounting pins X and Z have shanks provided with larger heads 209 fastened to the shanks by small angularly spaced screws 211.

It will be seen that the relative movement between the front and rear bucket sections is comparable to that of a parallel link or quadrangular link system, particularly as the bucket sections approach the bucket closing position. For example, starting with the bucket wide open and fully extended in a forward direction, as shown in FIGURE 14, preparatory to beginning a back-hoeing, dirt smoothing, or like operation, the initial downward movement of the front bucket section Bf has a slight arcuate component of motion in moving from approximately the position shown in FIGURE 14 to approximately the position shown in FIGURE 15, this arcuate component being represented by the dotted arc a—a. However, it should be pointed out that it is not during this initial range of downward movement of the front bucket section that the substantially straight rectilinear line of sweep of the rear cutting bit 195 is desired, but only after the front bucket section has moved into approximately the position shown in FIGURE 15, following which the operator can utilize this rectilinear straight line direction of sweep of the bit 195 to produce a finished horizontal surface in the top surface of the soil. This substantially straight rectilinear line of cutting or scraping is represented by the line b—b in FIGURE 15, which straight line travel b—b constitutes approximately two-thirds to three-fourths of the total distance of travel. FIGURE 16 shows the completion of the closing movement of the front bucket section Bf along this rectilinear line of travel b—b.

FIGURE 17 also shows the arcs of swing of the two mounting links 100 and 200. The front link 100 has its fulcrum pivot W located in close proximity to the bottom of the rear bucket section Br; the rear link 200 has its fulcrum pivot Y located approximately half-way down the vertical height of the rear bucket section; the straight line distance between these two lower fulcrum pivots W and Y being approximately twice the straight line distance between the two upper swinging pivots X and Z on the front bucket section. Preferably, the front link 100 is substantially longer than the rear link 200, so that the arc of swing A100 of the front link 100 has a considerable large radius and is substantially flatter than the arc of swing A200 of the rear link 200. The above proportioning of the lengths of the two mounting links 100 and 200, and location of the four pivot centers W, X, Y, and Z, gives the desired wide opening and far-reach of the front bucket section Bf, and also gives the substantially straight line of sweep b—b (FIGURE 15), and the substantially parallel closing motion between the grappling jaws 108 and 110. This figure graphically illustrates part of the translatory motion between the two bucket sections by showing three successive positions of the front bucket section Bf as it moves back toward the rear bucket section Br. The first position is shown in full lines, with the upper pivots of the lines 100 and 200 in the positions X and Z. The second position is shown in dotted lines, with the upper pivots of the links moved rearwardly along the arcs A100 and A200 into the positions X' and Z'. The third position is shown in dash-dot lines with the upper pivots moved rearwardly into the positions X" and Z". It will be noted that during these sucessive stages of movement, the rear cutting edge 195 of the front bucket section follows a substantially straight line of travel with respect to the ground. It will be understood, of course, that there may be substantial variations in the lengths of the links 100 and 200, and in the locations of the centers W, X, Y and Z without departing from the invention.

FIGURES 18 and 19 illustrate the thus far described basic structure modified in accordance with the present invention by providing the front bucket section Bf with a swinging gate 215 for alternately closing either the front opening 188 or the rear opening 189 of this front bucket section. This swinging gate 215 is formed with a dished or arcuate closure portion 216 extending almost the entire width of the front bucket section, and terminating in parallel side walls 217 which extend inwardly in parallel relation between the side walls 185 of the front bucket section. The gate side walls have pivotal mounting substantially centrally of the front bucket section on pivot pins 218 which have their inner ends mounted in the gate side walls 217 and extend outwardly through bearing bushings 219 in the bucket side walls 185. Anchored to the outer ends of these pivot pins 218 on the outer sides of the bucket side walls are crank arms 222 which have pivotal connection at 223 with the piston rods of double-acting hydraulic rams 225, preferably disposed at each side of the bucket, although only one ram may be employed, if desired. The pivoted end of each ram cylinder has pivotal mounting at 227 at a bracket 228 secured to the side wall 185 of the bucket section. The leading edge of the gate 215 is transversely reinforced by a reinforcing or cutting plate 215a, which is adapted to close against the leading edge of the bucket bottom plate 186 when the gate is in the position illustrated in full lines in FIGURE 18, closing the open front 188 of the front bucket section. The opposite or trailing edge of the gate 215 is likewise reinforced with a transversely extending reinforcing or cutting bar 215b, which is adapted to abut against the rear or trailing portion of the bottom bucket plate 186 when the gate has been swung into the position illustrated in dash and dot lines in FIGURE 18, in which position the gate substantially closes the rear opening 189 of the front bucket section. The opposite ends of the ram cylinders 225 have hydraulic connections 229 with any conventional valving control arrangement at the operator's seat on the tractor, by the manipulation of which the gate 215 can be swung into either of the two positions shown, or can be swung into an intermediate position, for dumping or other purposes, the hydraulic rams being effective to lock the gate in any of these selected positions.

FIGURE 22 diagrammatically illustrates some of the additional earth moving functions which can be performed by the front bucket section Bf when it is thus equipped with the swinging gate 215. For example, in trenching or deep-digging operations, the front bucket section Bf can then be employed entirely independently of the rear bucket section Br. Thus, to scoop earth from the forward slope 230 of an excavation, the gate 215 can be swung back hydraulically into its rear position to close the rear opening 189 of the front bucket section, whereupon the front cutting edge 190 or 193 is moved forwardly and upwardly to cut soil from the forward bank 230, for filling the front bucket section with soil, up against the closure gate 215. In the overhead dumping operation, this loaded front bucket section can be elevated to the position of maximum lift obtainable through the lifting and tilting arms 30, 78, with the entire load of soil being held against spillage from the back of the front bucket section by the closed position of the swinging gate 215. In this elevated position, the load can be dumped from the front bucket section by swinging the closure gate 215 clockwise into an intermediate position sufficiently open to permit the load to discharge from the rear of the front bucket section over the rear cutting edge 195 of the latter. This discharge over the rear cutting edge 195 is substantially higher than can be obtained by any discharge over the front cutting edges 95 or 190 of the back or front sections.

The ability of the closure gate 215 to be swung into a position for closing the front side or opening 188 of the front bucket section also enables this front bucket section to be loaded through the rear opening 189 of such bucket section. For example, this enables soil to be cut from a back or rear slope 231 of an excavation, ditch, or the like, by causing rearward and upward motion of the rear cutting edge 195 along such slope, the soil thus loosened falling into the front bucket section up against the closure gate 215 which is then in its forward position of closure, as shown in dotted lines in FIGURE 22. The dumping of the front bucket section thus loaded through its rear opening can be effected by tilting this section rearwardly and dumping over the rear cutting edge 195, or by tilting forwardly and raising the gate 215 sufficiently to dump over the front cutting edge.

For conventional use where the entire load picked up by the front bucket section is to be elevated and dumped into a particular location, the curved back wall 216 of the closure gate 215 is necessarily an imperforate solid sheet, as shown in FIGURE 19. However, there are frequently situations where it is desirable to effect a separation between the gravel or large pieces of rock and the "fines," such as loose dirt, sand, etc. To this end, the curved back wall of the gate may be formed of a perforated sheet, such as indicated at 216a in FIGURE 20, or such back wall may consist of transversely extending spaced cross bars or slats, as indicated at 216b in FIGURE 21. Such perforated or slatted back wall of the gate 215 is also of utility in agricultural situations, wherein the bucket may be used to dig up beets, potatoes, etc., and where it is desired to separate the loose soil from the produce by such a screening or separating operation. These beet and potato harvesting operations are now frequently conducted on a large scale.

In FIGURES 23–26, I have shown another embodiment of the invention employing substantially the same form of swinging closure gate 215 previously described; but wherein the hydraulic ram 225 is dispensed with, and the movement of the gate 215 between its different positions is effected manually by a pull rope and over-center spring; or by the weight of the load alone; or in conjunction with sudden inertial movements of the front bucket section. In such embodiment, the gate is locked in any desired one of its three positions by a manually tripped latching mechanism, comprising a swinging sector bracket 234 fastened to each end wall 217 of the closure gate 215 to swing therewith. This sector bracket has a hole for passing the bearing pin 218, and also formed in this bracket along an arcuate semicircle, below and concentric with the bearing pin 218, is a series of detent pockets 236, 237 and 238. Adapted to engage selectively in any desired one of these detent pockets is a spring-pressed latch 240 mounted in a latch housing 241 secured to the inner side of a mounting bracket or plate 239 which has its ends welded to the reenforcing edge bars 110 and 187 of the front bucket section, and which plate may be bowed slightly outwardly to provide space between the plate and the depressed middle area of the front bucket section. The latch or bolt 240 is adapted to engage in detent pocket 236 when the closure gate is closing the front opening of the bucket section; to engage in pocket 237 when the gate is in an intermediate position; and to engage in pocket 238 when the gate is in its opposite or rearward position of closure.

The latch 240 responds to the camming action of a slide 242 which is normally pressed toward the closed front end of the housing 241 by the compression spring 244, and which is adapted to be manually pulled in the opposite direction by a tripping rope or cable 245 tied to a screw eye 246 threading into the end of the slide. This slide 242 can be of rectangular or round cross section, with the housing 241 of corresponding shape. The latching bolt 240 is free to take any inward or outward position in a long central axial slot 247 formed lengthwise in the slide 242. Passing transversely through the bolt 240 is a camming pin 248 having its upper and lower ends projecting into upper and lower diagonally inclined cam slots 249, 249' formed in the upper and lower portions of the slide 242 throughout the length of the central axial slot 247. When the spring 244 holds the slide 242 pressed rearwardly, the bolt 240 remains in its locking position engaging in any selected one of the detent holes 236, 237 or 238. When the tripping rope 245 is pulled, the forward motion of the slide 242 causes the cam slots 249 to retract the bolt 240 out of such detent hole for freeing the closure gate 215 to permit swinging thereof into another position.

Swinging motion may be imparted to the gate through a lever or crank arm 251 extending outwardly from operative connection with the swinging gate 215 at a point on the outer side of the gate side wall 217, and outer side of the bucket side wall and sector bracket 234. The hub of this crank arm 251 is mounted on the outer extremity of the bearing shaft 218, which has its inner end anchored to the gate side wall 217. The outer face of the crank arm 251 is spaced from the inner face of mounting plate 239. Connected to crank arm 251 at point 252 is a gate swinging pull rope 253, and also connected to crank arm 251 at point 254 is an over-center tension spring 255. The opposite end of this tension spring 255 is anchored to a fixed point 256 on the mounting plate 239 or bucket side wall, this fixed point of anchorage being so related to the axis of the bearing pin or shaft 218 that the spring can have its over-center action. For instance, in the full-line position of crank arm 251, as shown in FIGURE 23, the spring is holding the swinging gate in its front closure position. When the operator pulls on rope 253, this swings crank arm 251 counterclockwise into the over-center position shown in dotted lines, in which operation the weight of the gate helps in getting over-center. Here, the tension of the spring 255 tends to hold the gate in its rear closure position until the operator again pulls on rope 253 for swinging the gate back into its position of front closure, or into its intermediate latching position. The two ropes or cables 245 and 253 extend through eye guides 258, etc., on one or both bucket sections so that the translatory opening and closing movements of the bucket will not interfere with the pulling functions of the ropes.

Provision can be made for readily mounting either of the above-described closure gates 215 within the front bucket section B$f$, and readily dismounting them therefrom, such as by arranging the pivot shafts 218 for ready removal and replacement. Obviously, the closure gate embodiment of FIGURES 23–26 can also be utilized as shown in FIGURE 22.

In FIGURES 27–29, I have shown another form of swinging closure gate 215$b$, which is preferably in the form of a substantially flat swinging vane provided with U-shaped pivot loops 261 spaced along the upper edge of the vane for sliding pivotal mounting on a transverse pivot rod 262 extending between the upper front edges of the front bucket section B$f$. The ends of the pivot rod 262 are anchored in mounting brackets 264 of inverted U-shape which slip down over the upper front edges of the side walls 185 of the front bucket section, these mounting brackets being releasably secured in such mounted positions by set screws, bolts or rivets 266 passing through the brackets and either gripping or passing through the side walls of the bucket. This vane type of closure gate is swingable about its upper pivot loops 261 between a front closure position where the vane closes the front opening 188 of the bucket section, and a rear closure position where the gate or vane closes the back opening 189 of the bucket section, the first of these positions being illustrated in full lines and the second in dotted lines in FIGURE 27. Such swinging motion may be caused by the pressure of the soil or load material being forced through either such front or back opening over the front or back cutting blades 190 or 195 at the bucket edges, in which operation the load material pushes the closure vane ahead of it. If desired, the swinging motion of the vane may be stopped at either extreme position by having it encounter stop shoulders projecting upwardly from the bottom wall of the bucket section, or projecting laterally inwardly from the side walls of the bucket section. Where the inside bottom surface of the bucket section B$f$ has irregularities formed therein, or where the lower edge of the vane has one radius or arc of swing for closing the front opening 188 and a different radius or arc of swing for closing the back opening 189, the ability of the pivot loops 261 to slide on the pivot rod 262 permits the vane gate to move up or down to accommodate such conditions. Alternatively the lower edge of the vane may be provided with a transverse flexible skirt composed of rubber belting, leather, or the like, for yieldably maintaining contact with the inside bottom surface of the front bucket section throughout all swinging movement of the vane gate. Adjacent to its swinging end, each side of the gate 215$b$ is provided with a bolt hole 266 for receiving a fastening bolt 267. Correspondingly, each side wall of the front bucket section is provided with a series of locking holes 268, 268$a$, 268$b$, etc., for registering with the bolt hole 266 to receive the bolt 267, with the gate 215$b$ either projecting forwardly from the bucket section to bull-doze, or retracted slightly back into the bucket section for other operations. Rear locking holes 268$d$ may also be provided adjacent to the rear edges of the front bucket section for receiving the bolts 267 to lock the vane gate in a rearward position.

I may also provide this vane type of closure gate with a positive stop link mechanism 270 connected between the gate and the front bucket section and which acts reversibly to positively bring the gate to a stop when the gate reaches its front closure position, and also to bring it to a stop when the gate reaches its rear closure position. This mechanism comprises a thin metallic link 271 which is set edgewise in a narrow clearance space 273 (FIGURE 28) between the inner surface of the bucket side wall 185 and the adjacent side edge of the closure gate 215$b$, such clearance space being preferably provided by notching out a slight portion of the edge of the gate adjacent to its lower end. One end of the link 271 is pivotally connected to the gate at 274 on a pivot lug 275 bent inwardly from the edge of the gate adjacent to the bottom of the clearance space 273. The other end of the link 271 passes freely through a thin vertical slot 277 (FIGURE 29) extending diametrically through a rotatable cylindrical stop shank 278 which has rotatable mounting in the side wall 185 of the bucket section, the location of this rotatable mounting being above the arc of swinging movement of the pivot pin 274 and lug 275 as the gate swings from one closure position to the other. The projecting end of the link 271 beyond the stop shank 278 has thin vertically projecting stop projections 279 adapted to have stop engagement against the back side of the rotatable stop shank 278 at points above and below the ends of the thin diametrical slot 277. As the gate swings from one closure position to the other, the clearance space 278 passes the link 271 from one side of the gate to the other, and this clearance space 273 is provided with a slightly deeper notch area 273′ to pass the rotatable stop shank 278. This vane type of gate enables the front of the bucket section to cut soil with a forward motion, with the soil entering in over the front cutting edge 190; or it enables the back of the bucket section to cut soil with a backward motion, with the soil entering in over the back cutting edge 195, the vane gate being automatically swung to the appropriate position to accommodate either of these operations by the pressure of the incoming soil. This vane type of gate may be readily removed from the front bucket section by releasing the clamping bolts 265 holding the hinge pin brackets 264, and by removing the rotatable stop shank 278.

In FIGURES 30–34, I have shown how the basic construction of bucket on which my invention is mounted is supplemented by the further provision of a lateral tilt, swivel joint 335 which is interposed between the bucket B and the front ends of the lifting arms 30 and tilting arms 78. The purpose of this lateral-tilt, swivel joint 335 is to permit the bucket to be tilted to right or left about what may be referred to as a trunnion or fifth-wheel axis $x$—$x$ extending generally fore-and-aft substantially in prolongation of the front ends of the lifting and tilting arms 30, 78. This swivel joint greatly increases the field of utility of the device, such as, for example, by permitting the bucket to work substantially horizontally on its side, as for excavating horizontally under an overhanging ledge or the like; also, it permits the grappling jaws 108 and 110 to open and close with substantially horizontal movements therebetween for grasping either a vertically extending tree trunk, telephone pole, fence post, or the like, whereby to perform the operation of pulling the latter upwardly out of the ground, or to perform the operation of lowering the latter downwardly into a previously prepared hole in the ground. In this swivel joint construction, the bosses 87 which mount the supporting arm pivot pins 80 and the bosses 88 which mount the tilting arm pivot pins 82 are welded to the four corners of a rectangular plate fixture 336, which constitutes the non-rotating portion of the swivel joint 335. It will be seen that this swivel plate fixture 336 responds to the raising and lowering motions and the tilting motions of the arms 30 and 78. The revolvable portion of the swivel joint consists of a relatively large diameter tubular boss or ring 337 which is welded to the back wall 95 of the rear bucket section B*r*, and which projects rearwardly therefrom through a circular swivel opening 338 in the swivel plate 336. The swivel boss 337 comprises a large diameter front portion 339 and a reduced diameter rear portion 340, the right angle shoulder 342 at the junction of these two portions having a rotative abutment fit against the front surface of the swivel plate 336. Formed in the reduced boss portion 340, on the back side of the swivel plate 336 is an annular locking groove 344 in which engage two locking or retaining segments 345 that overlap the rear face of the swivel plate 336 and retain it in the swivel seat 342. These segments 345 are formed with their inner arcuate surfaces curving upwardly out of the retaining groove 344 and terminating in upper pivot eyes 347 mounted on pivot pins 348 projecting rearwardly from the rear surface of the swivel plate 336. The lower ends of these locking segments 345 are adapted to be releasably locked together by an arrangement of pivoted links 349 and camming hasp 350, the release of which enables the segments to be swung outwardly and upwardly around their upper pivots 348 into releasing position, enabling the swivel boss 337 to be pulled forwardly through the swivel opening 338 in the swivel plate 336. It will be seen from the foregoing that the entire bucket assembly B consisting of the front and rear bucket sections is revolvable in the swivel joint 335 into laterally inclined or horizontal operating positions, substantially as illustrated in dotted lines in FIGURES 30 and 31.

Such swivelling movements are effected by power means preferably in the form of a hydraulic ram 352 comprising a cylinder 353 and a piston 354, the piston being pivotally connected to the swivel plate 336 by a pivot pin 355, and the cylinder being pivotally connected to the swivel boss 337 by forming a pivot clevis 357 along one side of the cylinder 353, and by forming a pivot tongue or lug 358 projecting radially inwardly at the rear end of the reduced swivel boss portion 340 for entry into the clevis 357. The pivot pin 356 passes through aligned pivot apertures in such clevis 357 and pivot tongue 358. It will be seen from FIGURE 31 that the line of thrust of the hydraulic ram 352 is so related to the arc of swing of the crank pin 356 connecting the cylinder 353 with the swivel boss 337 that the ram is capable of revolving this boss and the bucket through the 90° range ordinarily desired; and, in fact, the ram is capable of revolving the bucket through approximately 120° or more. The hydraulic ram is, of course, double-acting, and it can therefore be made to function as a locking device for locking the bucket in any desired angle of tilt. The two flexible hydraulic hose lines connecting with opposite ends of the ram cylinder are indicated at 361. In addition, two flexible hose lines 362 may extend outwardly through the large circular opening within the tubular swivel boss 337, the front ends of these lines which swivel with the bucket connecting through branch lines leading to the upper and lower ends of the two ram cylinders 104 which open and close the bucket sections; the flexibility of these hydraulic lines 362 passing through the tubular swivel boss 337 being frequently relied upon to accommodate all of the swivelling movements of the bucket. However, if desired, a two-way fluid conducting rotary union 364 may be mounted centrally of the axis of the swivel joint, as upon a spider 365 extending inwardly from the swivel boss 337, to accommodate the relative swivelling movement between the front rotating hose lines and the rear non-rotating hose lines. These two-way rotary fluid conducting unions 364 are well known.

In FIGURES 30–31, the bucket B is illustrated in its normal non-rotated position in full lines, and is illustrated in a swiveled or tilted position in dash-dot lines, these two positions being displaced approximately 90° from each other.

In FIGURE 34, we have shown the bucket as having been swiveled or revolved through approximately 90°, with its grappling jaws 108, 110 embracing the vertical trunk of a tree 370. As previously described, by reason of the multiple link mounting and the translatory closing movement of the front bucket section, these two grappling jaws can be made to engage the opposite sides of a tree trunk, telephone pole, fence post, or the like, under extremely high grappling pressures. In FIGURE 34, the root structure 371 of the tree is shown in vertical alignment with a hole 372 in the ground, this figure thereby serving to illustrate either the operation of forcibly uprooting the tree by pulling its root structure upwardly out of the ground, leaving the hole 372; or serving to illustrate the operation of resetting or planting the tree by lowering its root structure 371 down into a previously dug hole 372. Also, as previously referred to, with the bucket tilted to this approximately horizontal position shown in FIGURE 34, it can be made to dig soil out from under an overhang or to perform other soil moving operations in what would generally be considered as inoperative or abnormal positions. The mounting of the bucket on the swivel joint 335 also permits either complete side dumping, or a gradual spilling of the bucket load, to one side or the other of the line of travel of the tractor. In performing excavating operations, stripping operations, etc., where it is difficult to swing or steer the tractor sidewise because of cramped quarters, the loaded bucket can be rotated laterally around the axis of the swivel joint 335 for dumping the load over the side edges of thhe bucket sections, either into a truck disposed to one side, or onto a laterally disposed dumping site. The swivel joint also permits a gradual spilling of the bucket load over the side edge during continued forward travel of the bucket. For example, by providing such swivel mounted bucket with front pusher roller, the bucket can push a dump truck ahead of it for receiving a load therefrom, following which the bucket can be swiveled to spill or spread to the side at a graduated rate while it is still traveling forwardly, such procedure being advantageous when it is desired to spread a thin bed of black soil along the bottom of a trench preparatory to the laying of metallic pipe therein, the black soil bed minimizing corrosion of the metallic pipe. This side dumping or side spreading is hence a further advantage of the swivel joint mounting of the bucket.

In FIGURES 35–46, there is shown a further modification comprising front and rear material handling sections F and R which are also link connected at their opposite sides by the pairs of links 100″ and 200″ pivoted at W, X, Y and Z to give the aforementioned translatory motion between the front and rear sections F and R. In this modified embodiment, the rear section R is not shown as a bucket section, but instead is shown as a grappling section having grappling jaws 108″ carried by or formed along the opposite side edges of this rear section R. This rear section has the previously described pivotal mounting 80 on the pair of lifting and lowering arms 30 which extend forwardly from the rubber-tired or crawler tread tractor. The tilting of this rear section R is also effected by much the same type of tilting or automatically self-leveling linkage previously described. For example, this linkage includes tilting arms or links 78 having their front ends pivotally connected at 82 to the upper portion of the rear grappling section R, and having their rear ends pivotally connected at 76 to the upper ends of the motion transmitting levers 72. These levers 72 are pivotally mounted at their lower ends on the pivots 74 carried by the lifting and lowering arms 30, and have intermediate pivots 70 connected through links 68 extending rearwardly for operative connection with the hydraulic rams that control the tilting of the material handling sections about the lifting and lowering pivots 80.

In this embodiment, the rear section R comprises right and left pairs of spaced grappling jaw plates 405–406 having the rear grappling jaws or teeth 108″ formed in their forward edges. These pairs of spaced grappling jaw plates 405–406 are disposed in the inwardly disposed planes of the lifting arms 30 and tilting arms 78, the lower pivots 80 for the lifting arms 30 being disposed between the lower ends of said plates, and the upper pivots 82 for the tilting arms being between the upper ends thereof. Extending transversely between the mid-portions of each pair of these spaced plates 405–406 is a transverse reinforcing web 407 (FIGURE 38), and extending transversely between the right and left pairs of these plates is a cross connection in the form of a transverse tube or shaft 408 within a surrounding heavy tube or pipe section 410. The inner plates 405 of each pair are also connected by tubular housings 411 and 412 (FIGURE 45) which have their outer ends welded to such plates, these tubular housings enclosing latch releasing cross shafts 414 and 416 which will be presently described.

Also mounted on the cross connecting shaft 408 and tubular member 410 are additional right and left hand pairs of link mounting plates 418–419 located inwardly of the pairs of spaced grapping jaw plates 405–406. As viewed edgewise in FIGURE 59, the two inner mounting plates 418 are welded at their bottom ends to the tube 410, and have their intermediate portions cross-connected by a transverse web or bar 417. Also, the pairs of mounting plates 418–419 are joined together at their rear edges, in rear of the ram cylinders 104′, by cross webs 417a, and each plate 419 is cross-connected to the next adjacent plate 405 by a transverse web 417b. Moreover, the innermost of the hubs or bosses which mount the pivot pins 82 in the plates 405–406 may be welded to the adjacent plate 419. As viewed from the side (FIGURE 35), these pairs of spaced mounting plates 418–419 comprise upwardly and rearwardly extending arms between which pass the transverse pins constituting the pivots Y on which are mounted the lower ends of the two upper or rear mounting links 200″. Pivotally mounted for swinging movement between the pairs of stationary mounting plates 418–419 are the double-acting hydraulic rams 104′ which produce the opening and closing movements between the front and rear material handling sections F and R. The cylinders 142′ of these rams have pivotal attachment at their lower ends with the cross connecting member 408, and the piston rods 144′ have pivotal connection at their upper ends with the pivot pins constituting the pivotal connections Z of the mounting linkage. As best shown in FIGURE 38, the rear ends of the pair of upper or rear mounting links 200″ are pivoted at Y between the upper ends of the stationary mounting plates 418–419, so that these mounting links 200″ swing between each pair of mounting plates 418–419. The front ends of such mounting links 200″ extend into yoke eyes 143′ on the upper ends of the piston rods 144′ and these yoke eyes lie between the bifurcated rear ends of heavy yoke arms 420 extending rearwardly from the upper portion of the front load handling section F. The pivot pins Z pass through links 200″, yoke eyes 143′ and yoke arms 420.

The other mounting links 100″ swing in planes directly inside of the planes of the plates 418 (FIGURE 38), these links having their lower or rear ends mounted on the pivots W which extend transversely between the upper portions of the stationary mounting plates 418 and pivot lugs 417′ on the cross yoke 417 which joins these plates. In this construction, the pivot pins 82 at the forward ends of the tilting links 78 may have their axes coincidental with the mounting link pivots X, although this is not essential. The two mounting links 100″ are cross connected by a transverse web 421, and have their upper ends extending into slots 422 formed in the transverse upper rear portion of the front bucket section F for mounting on pivot pins X. The upper ends of these front mounting links 100″ are pivotally connected at the pivots X with the upper portion of the front grappling and bucket section F.

Referring again to the transversely extending tubular housings 411–412 and to the latch releasing cross shafts 414–415 rotatably mounted therein, it will be seen from FIGURE 45 that the ends of both upper and lower tubular housing 411–412 terminate in welded attachment to the inner grappling plates 405 of each pair of plates, but the cross shafts 414–415 extend transversely through both grappling plates 405–406. Mounted on the upper cross shaft 414 between each pair of grappling plates 405–406 are latching dogs 424, and mounted on the lower cross shaft 415 between the same bracket plates are latching dogs 425. The upper latching dogs 424 are positioned to swing down into latching relation with respect to an upper series of aligned latching notches 428 formed as a part of the grappling teeth 108″, and the lower latching dogs 425 are likewise positioned to swing down into latching relation with respect to a lower series of aligned latching notches 429 formed at the lower end of the grappling teeth 108′. These upper and lower latching notches 428–429 are adapted to receive upper and lower transversely extending latching pins 431–432 on the front section F, as will be presently described. The upper latching dog 424′ at the right-hand side is formed with an actuating arm 434 extending rearwardly therefrom, and the lower latching dog 425′ at the right-hand side is similarly formed with an actuating arm 435 extending rearwardly therefrom. Tension springs 436–437 connected between these actuating arms and pins or lugs 438 projecting from the bracket plates 406, normally hold the latching dogs swung down into latching position with respect to the notches 428–429. Connected to the upper actuating arm 434 is a first releasing pull cable or rope 440, and connected to the lower actuating arm 435 is a second releasing pull cable or rope 441. These two pull cables 440–441 extend downwardly between the grappling jaw plates 405–406 and then pass rearwardly around the underside of the pivot eye at the forward end of the adjacent lifting arm 30. Thence, the cables pass rearwardly along one or both sides of the lifting arm 30, being extended to control levers, or other appropriate control devices located at the operator's position on the tractor. It will be seen that pulling the cable 440 is operative to release the upper latching dogs 424, and that pulling on the other cable 441 is operative to release the lower latching dogs 425. By virtue of the fact that both cables pass around the pivot eye at the forward end of the adjacent lifting arm 30, it will be seen that tilting motion of the rear grappling section R around the axis of the lower lifting pivots 80 will not accidentally trip the latching dogs.

Also mounted on the outer side of the right-hand grappling jaw plate 406 is a Z-shaped tripping hook or lever 444 which is pivotally mounted on a pivot pin 445 passing through the end of the lower arm of the lever and into the plate 406. The reversely extending upper arm of the lever functions as a latching hook 448 for coacting with a downwardly projecting hook end 449 on a latching link 451 carried by the front grappling section F, to be presently described. A third pull cable 452 connects to the lower elbow of the tripping lever 444 for swinging this lever in a counterclockwise direction, in opposition to a tension spring 453 which also hooks to this lower elbow and tends to maintain the tripping lever 444 swung clockwise into the position illustrated. This third pull cable 452 passes down around a cylindrical boss or sheave 455 mounted on the adjacent side plate 406 coincident with the pivot axis 80, the cable thence extending rearwardly along the lifting arm 30 to a third control lever or other control device located at the operator's position on the tractor. As it will be later described, this third cable effects the unlatching of the two portions of the front material handling section F.

Referring now to the details of the front material handling section F, this comprises a bucket section Bf' and also comprises a swinging closure gate 215', the bucket section Bf' being quite comparable to the previously described front bucket section Bf, and the closure gate 215' being quite comparable to the previously described swinging closure gate 215, this closure gate swinging on bearing pins 218' carried by the bucket section Bf' for alternately closing either the front or rear open sides of such bucket section Bf'. However, in this modified construction, the swinging closure gate 215' is formed with a main or front set of grappling teeth 457 and a secondary or rear set of grappling teeth 458, and also carries the aforesaid upper and lower latching pins 431–432 for effecting latching engagement with the upper and lower latching dogs 424–425 of the rear grappling section R. The plates 459 in which are formed the main grappling teeth 457 are welded to the curved back plate 216' of the closure gate; and also welded to this back plate at inwardly spaced points are mounting lugs 460. The latching pins 431–432 pass transversely through the grappling toothed plates 459 and through the lugs 460. The plates 459 and lugs 460 lie in planes just outside of the plates 405–406 so as to embrace the latter, whereby the latching pins 431–432 are free to enter the latching notches 428 and 429 when the swinging gate 215' is to establish latching engagement with the rear grappling section R.

As shown in FIGURE 35, the latch releasing hook 449 has crank mounting on a rock shaft 462 which is rotatably mounted in suitable bearing brackets projecting from the back plate 216' of the closure gate, and which extends from side to side of this back plate. The outer ends of this rock shaft 462 carry crank arms 463 which have their upper ends pivoted to pull links 464 that extend inwardly through holes in the back plate for pivotal connection to the upper arms of bell-crank forms of latching dogs 466. Each latching dog is pivoted at 467 to the inner surface of the adjacent side wall 217' of the gate, and the dog is normally retained in the latching position shown by a spring 469 connecting with a downwardly extending arm of the dog. The bearing pins 218' are secured to the side walls 185' of the bucket, and project inwardly therefrom for reception in opposite latching slots or notches 471 which extend inwardly from the free edges of the gate side walls 217. The hook noses of the opposite latching dogs 466 are adapted to hook down over the inner ends of the adjacent bearing pins 218' for normally holding the swinging gate 215' on a relatively fixed axis 218' for swinging movement between front and rear closure positions with respect to the front and rear sides of the front bucket section Bf. The gate 215' is positively prevented from becoming unlatched from the bearing pins 218' of the front bucket section so long as the latching pins 431 and 432 are not latched rearwardly under the latching dogs 424 and 425. However, when the closure gate 215' has such latched attachment through the pins 431–432 to the rear grappling section R, then the downwardly facing hook nose of the latch releasing crank 449 is engaging over the upwardly extending hook end of the Z-shaped releasing lever 448, whereby the operator can by pulling the third cable 452 thereby release the latching dogs 466 to permit the outward swinging separation of the bucket section Bf' from the closure gate 215', as shown in FIGURE 39.

During the time that the swinging gate 215' is occupying the relation of pivotal mounting in the bucket section Bf' on pivot pins 218', it can be swung alternately into either the front closure position illustrated in FIGURE 41 or the rear closure position illustrated in FIGURE 35 through the instrumentality of one or more double acting hydraulic rams 475 projecting upwardly from the upper outer corner portions of the front bucket section. Such swinging motion can be effected by a single hydraulic ram 475 mounted on one of the bucket side walls, but we preferably employ duplicate hydraulic rams mounted in notches 476 in the opposite side walls of the top portion of the bucket. Pivot pins 477 projecting laterally from the lower portion of each ram cylinder have pivotal mounting in the sides of each mounting notch 476. The axis of these pivot pins 477 is coincident with the axis X between the front mounting links 100" and the front bucket section Bf, so that the rams 475 can swing relatively to the bucket section and the bucket section can swing relatively to the rams. The piston rod 480 extending from the ram cylinder connects with a long thin reach rod or bar 482 which extends downwardly between the inner surface of the bucket side wall and the outer surface of the gate side wall, the lower end of this reach bar 482 having pivotal connection with a pivot pin 484 anchored in the gate side wall 217'. The relationship is such that when the piston rod 480 is extended, the closure gate 215' swings into its rear closing position closing the rear side of the bucket section, and when the piston rod is retracted upwardly, the closure gate swings forwardly into its front closing position for closing the front side or opening of the bucket section, as shown in FIGURE 41. In this latter position, a transverse abutment 486 on what may be termed the leading edge of the swinging gate, is adapted to abut the front cutting edge 190 of the bucket section, in which position a leading or front cutting edge 488 on the swinging gate projects forwardly and downwardly into a cutting position beyond the cutting edge 190 of the bucket section. The opposite or trailing edge of the swinging gate 215' is also provided with a transversely extending cutting edge 490 adapted to overlie the rear cutting bit 195 across the rear edge of the bucket section when the closure gate is in the rearward position of closure shown in FIGURE 29. In this position, the projecting cutting edge 488 can function for stripping soil, for deep digging, for bull-dozing, etc. Extending from the projecting cutting edge 488 towards the center of the closure gate 215 is a curved face plate 492 which functions to stiffen the closure gate, and also to turn or roll the soil when the cutting edge 488 is bull-dozing, etc. The side walls 217' of the closure gate are also formed with spurs or hooks 494 projecting in a rearward direction from the ends of inwardly cut recesses 495. These spurs 494 function as grappling or holding teeth for use in different grappling situations, such, for example, as is indicated in dotted lines in FIGURE 42. If desired, a transverse cutting or gripping bar may extend crosswise between the spurs 494.

As above described, the main or front set of grappling teeth 457 formed in the inwardly set plate 459 carried by the swinging gate 215' move into positions directly outside the grappling tooth plates 406 of the rear section R so as to have grappling co-operation therewith. On the other hand, the rear second set of grappling teeth 458 are formed directly in the vertical free edges of the swinging gate side walls 217' so that these secondary grappling teeth are adapted to co-operate primarily with the set of grappling teeth 110' on the back edges of the front bucket section Bf when the different parts are in the operating relation shown in FIGURE 39.

Figure 39:
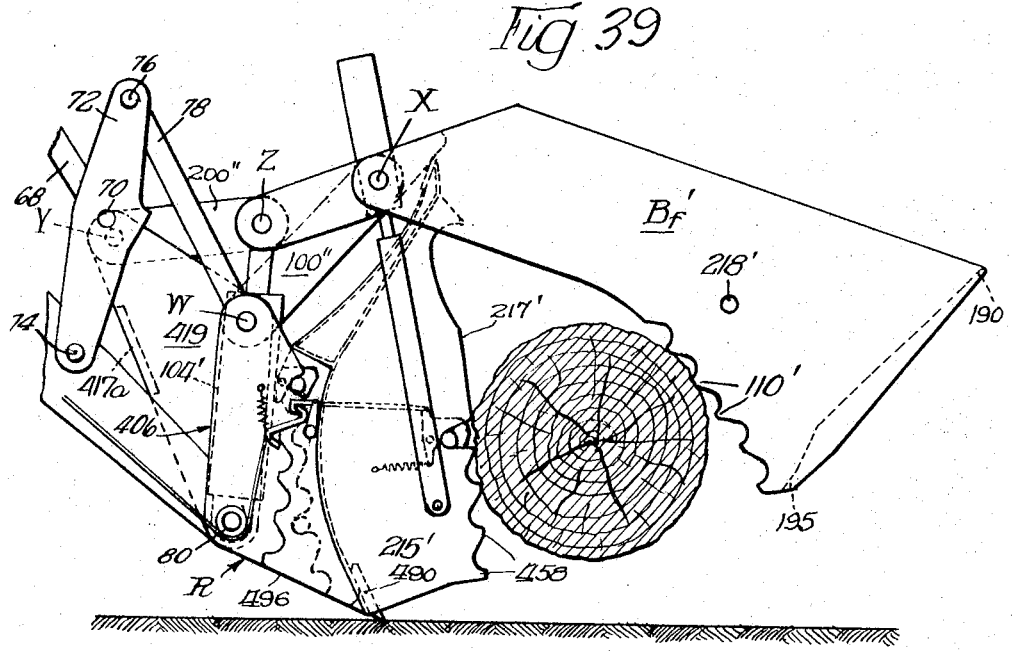
Figure 40:
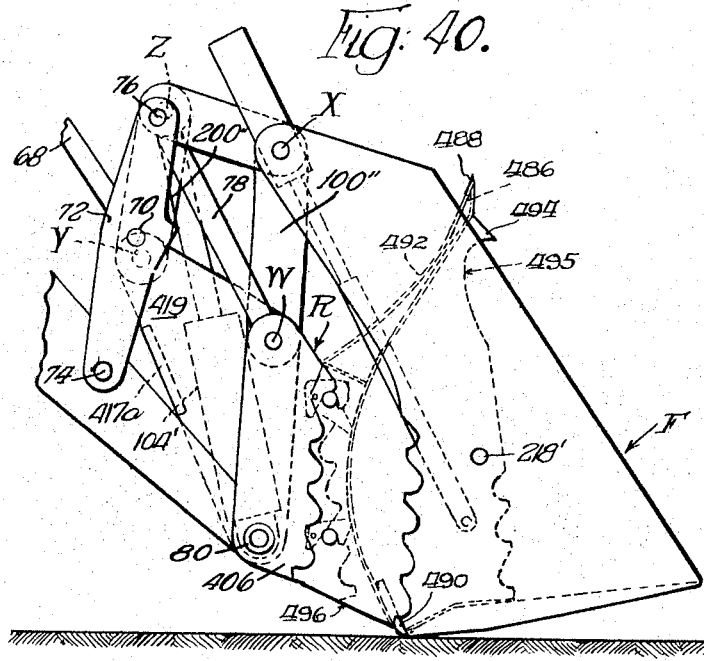

By way of explanation of some of the different operating relations possible with this last described embodiment, FIGURE 39 shows the closure gate 215' latched to the rear grappling section R, with the front bucket section Bf released from the closure gate through release of the bearing pin latches 466, and showing this front bucket section swung upwardly. FIGURE 40 shows the closure gate 215' latched to the rear grappling section R, and with the front bucket section B*f* remaining in latched relation to the closure gate 215′. FIGURE 41 shows the closure gate revolved into its front closing position, closing the front side of the bucket section B*f*, and with the bucket section and closure gate operating in a downwardly extended position within a trench, excavation or the like. FIGURE 42 shows the bucket section in an elevated position, with the closure gate 215′ shown in full lines in what may be regarded either as a soil dumping or as a load grappling position, and with the closure gate shown in dotted lines in a different grappling position.

With regard to these different operating positions, ability to effect separate release of the upper and lower latches 424 and 425 is advantageous when the swinging closure gate 215′ is doing a bull-dozing operation in a forward direction of travel, with the front bucket section B*f* in a raised position, as shown in FIGURE 39. By releasing the upper latch 424 at this time, the closure gate 215′ can be tilted forwardly around the axis of the lower latch 425 and latching pin 432 for adjusting the bull-dozing angle of the closure gate 215′ and its cutting edge 490, without lowering the front bucket section B*f* to the point that it might interfere with the bull-dozing operation.

Moreover, in the performance of a grading, scraping or stripping operation wherein the bucket is traveling forwardly with the bottom surface of the front bucket section B*f* sliding like a shoe on the ground, and with the closure gate 215′ and its cutting edge 490 entering the soil to the depth determined by the gauge shoe action of the front bucket section B*f*, the ability to separately release the upper latches 424 enables the closure gate and its cutting edge 490 to be tipped around the latch pin axis 432 for varying the depth of cut of the cutting edge 490 relatively to the gauge shoe depth which the sliding front bucket section tends to establish.

Referring now to the capabilities of this latter embodiment for moving earth, gravel, rocks, etc., and for breaking up and loading road surfaces, concrete slabs, surface rock, etc., it should first be noted that this single bucket section embodiment is capable of performing all of the previously described functions, at least insofar as the front bucket section and the swinging closure gate are concerned. In the operation of breaking, picking up and loading different solid materials, such as road surfacing black-top, concrete slabs, surface rock, and the like, the front cutting edge of the front bucket section is forced in under the material, which has either been broken up previously, or which is broken up by the teeth on the front cutting edge of the front bucket section. After such front cutting edge has been forced under the material, which may extend part way or all the way into the front bucket section, the front cross-bar edge of the swinging closure gate is then swung down to establish a holding grip against the top of such material. Also, in the case of transversely extending material, the spurs or prongs 494 can be forced down against the top of such material under the hydraulic pressure exerted by the rams 475. Conversely, when operating in the reverse direction, the rear cutting edge of the front bucket section can be moved in under such material, following which the rear cutting or gripping edge of the swinging closure gate can be swung down into gripping engagement with the top surface of such load, under hydraulic pressure transmitted downwardly from the rams 475. With the material thus held between the front or rear cutting edges of the bucket section and the front or rear edges of the swinging closure gate, held downwardly under hydraulic pressure, the load can be raised and moved to any desired dumping location without the possibility of accidentally dropping or losing the load.

The provision of the forwardly projecting cutting edge 488 on the closure gate 215′ is of substantial advantage in performing fine grading operations. For example, by lowering the front bucket section B*f* to have its bottom surface in sliding contact with the surface of the ground, with the bucket being moved forwardly, this projecting cutting edge 488 can be raised or lowered to any desired degree for obtaining fine accurate grading. When a relatively thin grading cut is being made, the soil is generally picked up and rolled ahead, moving up the curved front face 492 of the closure gate. If, during such grading operation, larger areas of soil are encountered, the closure gate is swung upwardly to have such soil move inwardly over the front cutting edge 190 of the front bucket section, at which time the closure gate is occupying its rear closure position to close off the open rear of the front bucket section. Accordingly, a collection of dirt will accumulate in the front bucket section. When a low area is encountered over which it is desired to spread this dirt, the closure gate can be swung upwardly at the rear to provide a discharge opening between the rear cutting edge of the front bucket section and the rear cutting edge 490 of the closure gate. The above two steps of grading by having the soil enter the front bucket section over the front cutting edge 190, and spreading by having the soil discharge over the rear cutting edge 195 while the bucket is maintaining a direction of continuous forward travel, can be duplicated when the bucket is traveling in a reverse direction, so that there is no dead-heading in either direction of travel. In this reverse direction, the swinging gate 215′ may be placed in position so that its oblique bottom surface 496 functions as a skid shoe for sliding on the surface of the ground, to give some degree of support to the bucket section, in which position the rear cutting edge 195 of the bucket section is serving to pick up or strip off the top soil. The graduation of the depth of cutting in this reverse direction can be effected by tipping the front bucket section B*f* upwardly and backwardly with respect to the supporting surface 496 afforded by the closure gate. The front side of the front bucket section can thereafter be closed by swinging the closure gate into its front closure position, and the spreading operation can be carried out in this continued reverse direction of travel by swinging the closure gate upwardly from the front cutting edge 190 of the bucket section to discharge the soil from the front side of the bucket section.

Referring now to the grappling operations which can be performed by this single bucket section embodiment, it will be seen from FIGURE 35 that one or more objects can be picked up between the rear grappling teeth 108″ and the grappling teeth 457 projecting from the back side of the swinging gate 215′. In this regard, the shape or outline of the grappling opening defined between the teeth 108″ and the teeth 457 can be adjusted as desired by swinging the closure gate 215′ around the bearing pin axis 218′ so as to shape the grappling opening either with parallel sides, or with sides which converge toward the bottom or diverge toward the bottom. Such adjusted shape of grappling opening is rigidly maintained by the hydraulic rams 475.

FIGURE 39 illustrates another grappling relation wherein the grappling jaws 110′ along the rear edges of the bucket section co-operate with the grappling jaws 458 formed in the side walls 217′ of the closure gate. These co-operating sets of grappling teeth operate in the widely spaced planes of the bucket side walls and of the gate side walls.

FIGURE 42 shows the bucket section and its swinging closure gate in the performance of two grappling operations. In the first of these, a load object illustrated in full lines and designated L6 is shown as extending generally lengthwise into the bucket section through the rear opening thereof, this object being gripped between the rear cutting edge 195 of the front bucket section and the rear cutting edge 490 of the closure gate, these cutting edges being forced into gripping engagement with the load object under the action of the hydraulic rams 475. FIGURE 42 also illustrates in dotted lines a load object L7 extending into the bucket section through the front opening thereof. In this situation, the front cutting edge 190 of the bucket section has gripping engagement against the underside of the load object, and the spurs 494, or the transverse inner bar at this front edge of the swinging gate, establishes gripping against the upper surface of the load object L7.

It will be obvious that different structural features of the different embodiments may be interchanged if desired. For example, the swinging closure gates 215 shown in FIGURES 18 and 23 may be provided with one or both sets of grappling teeth 457 or 458, and may also be provided with the projecting cutting edge 488, spurs 494, etc. Also, the hydraulic rams 225 of FIGURE 18 and the hydraulic rams 475 of FIGURE 35 may be interchanged. In still another variation of the single bucket section embodiment shown in FIGURES 35–46, the bucket section may be mounted for swinging movement about a relatively fixed axis X which may be maintained in a rigid relationship to the rear grappling section R, as by converting the front swinging links 100″ into rigid extension arms extending upwardly from the rear grappling section R. In such variation, the upper or rear mounting links 200″ may be dispensed with. Such variation sacrifices the rectilinear or translatory motion between the front and rear sections, but most, if not all, of the other distinctive features of the single bucket section embodiment remain.

While I have illustrated and described what I regard to be the preferred embodiments of my invention, nevertheless, it will be understood that such are merely exemplary and that numerous other modifications and rearrangements may be made therein without departing from the essence of the invention.

I claim:

1. In load handling apparatus adapted for mounting on a self-propelled vehicle, said load handling apparatus comprising in combination:
   (a) a load handling bucket comprising front and rear bucket sections,
   (b) power operated lifting and lowering supporting arm means on which said rear bucket section is tiltably mounted,
   (c) power operated tilting means for tilting said rear load handling bucket section,
   (d) means connecting said front bucket section to the rear bucket section for relative opening and closing movements therebetween,
   (e) power means for effecting such opening and closing movements,
   (f) said front bucket section having an open front and an open rear, both provided with soil cutting edges for causing the entry of soil into said open front or into said open rear, and
   (g) a closure gate including a transverse closure wall extending substantially the width of the front bucket section and having side walls pivotally connected to the side walls of the front bucket section substantially centrally thereof, said closure wall being swingable about said pivotal connection for positionment either into a front closure position for closing the open front of said bucket section, or into a rear closure position for closing the open rear of said bucket section.

2. The combination of claim 1 which also includes
   (h) hydraulically operated power means carried by one of said bucket sections for causing movement of said closure gate about said central pivoted connection between it front and rear closure positions.

3. The combination of claim 1 which also includes
   (h) pull-cable mechanism actuatable by the operator from his position on said self-propelled vehicle for causing said closure gate to move between its front closure position and its rear closure position.

4. The combination of claim 1 wherein
   (h) said movable closure gate is of arcuate form having a front edge adapted to swing down against the bottom of the open front of said bucket, and
   (i) having a rear edge adapted to swing down against the bottom of the open rear of said bucket section.

5. The combination of claim 1 wherein
   (h) said movable closure gate has a plurality of apertures therein for separating out fine and coarse materials.

6. The combination of claim 1 together with
   (h) latch mechanism for latching said closure gate in each of said front and rear closure positions,
   (i) pull-cable latch releasing means adapted to be actuated by the operator from his position on said vehicle for releasing said latch mechanism, and
   (j) pull-cable gate operating means adapted to be actuated by the operator from his position on said vehicle for moving said closure gate from one of said positions to the other.

7. In load handling apparatus adapted for mounting on a tractor, said load handling apparatus comprising in combination:
   (a) power operated lifting and lowering supporting arm means adapted to be carried by said tractor and on which said load handling apparatus is mounted,
   (b) power operated tilting means for tilting said load handling apparatus relatively to said supporting arm means,
   (c) said load handling apparatus comprising a rear grappling section having grappling teeth in its front face,
   (d) a front bucket section having an open front and an open rear,
   (e) mounting means for movably mounting said front bucket section for movement toward and away from said rear grappling section,
   (f) a swinging closure gate pivotally carried by said front bucket section for movement either into a front closure position for closing the open front of said bucket section, or into a rear closure position for closing the open rear of said bucket section,
   (g) power means mounted on one of said sections for swinging said closure gate into either of said closure positions,
   (h) grappling teeth on said closure gate effective when said closure gate is in one of its closure positions to have grappling co-operation with the grappling teeth on said rear grappling section for grappling objects therebetween, and
   (i) latch mechanism for establishing a latched relation between said rear grappling section and said swinging closure gate.

8. The combination of claim 7 wherein
   (i) said latching mechanism comprises upper and lower latches carried by said rear grappling section and adapted to engage upper and lower latch pins carried by said swinging closure gate, together with
   (j) latch tripping means adapted to be actuated by the operator from his position on said tractor for selectively releasing said upper and lower latches.

9. In load handling apparatus adapted to be mounted on a tractor, said load handling apparatus comprising in combination:
   (a) power operated lifting and lowering supporting arm means adapted to be carried by said tractor and on which said load handling apparatus is mounted,
   (b) power operated tilting means for tilting said load handling apparatus relatively to said supporting arm means,
   (c) further means for turing said load handling apparatus about a fore-and-aft axis at an angle to said tilting,
   (d) said load handling apparatus comprising a rear grappling section having grappling teeth in its front face, (e) a front bucket section having an open front and an open rear,
(f) linkage mechanism connecting said rear grappling section with said front bucket section for relative opening and closing movements between said two sections,
(g) power means for effecting such opening and closing movements,
(h) a pivotally swinging closure gate carried by said front bucket section for movement either into a front closure position for closing the open front of said bucket section or into a rear closure position for closing the open rear of said bucket section,
(i) bearing pins carried by said bucket section and on which said closure gate has swinging mounting,
(j) latches carried by said closure gate adapted to have latching engagement with said bearing pins,
(k) means for releasing said latches to permit movement of said closure gate out of said front bucket section,
(l) hydraulic rams carried by said front bucket section and operatively connected with crank pins on said closure gate for swinging said closure gate around said bearing pins,
(m) grappling teeth carried by said closure gate for co-operation with the grappling teeth on said rear grappling section when said closure gate is in its rear closure position,
(n) secondary latching means carried by said rear grappling section,
(o) a latching pin carried by said swinging closure gate adapted to be engaged by said secondary latching means when said closure gate is substantially in contact with said rear grappling section,
(p) a latch tripping train of parts on said rear grappling section and on said closure gate for effecting the tripping of said first mentioned latch,
(q) and disconnectable parts in said latch tripping train adapted to be separated when said closure gate moves away from said rear grappling section.

10. The combination of claim 1
(h) further including means by which the load handling bucket is mounted on the lifting and lowering supporting arm means to turn on a fore-and-aft extending axis disposed at an angle to that about which the load handling bucket tilts, and
(i) means for turning the load handling bucket on said fore-and-aft extending axis.

11. In load handling apparatus adapted for mounting on a tractor, said load handling apparatus comprising in combination:
(a) a load handling unit including rear and front load handling sections,
(b) power operated lifting and lowering supporting arm means on which said rear bucket section of the load handling unit is mounted,
(c) power operated tilting means for tilting said section of the load handling unit relatively to said supporting arm means,
(d) said front load handling section being pivotally connected to the rear section for relative opening and closing movements therebetween,
(e) said rear load handling section being in the form of a rear grappling section having spaced side walls provided with front grappling teeth,
(f) said front load handling section being in the form of a single front bucket section having spaced side walls provided with rear grappling teeth,
(g) power operated means for effective relative opening and closing movement between said front grappling teeth and said rear grappling teeth,
(h) said single front bucket section having an open front and an open rear, and
(i) a swinging closure gate including a wall extending transversely of the space between the sidewalls of said front bucket section and having side portions pivotally connected to said sidewalls of the front bucket section for movement of the gate either into a front closure position for closing the open front of said bucket section or into a rear closure position for closing the open rear of said bucket section,
(j) said swinging closure gate being provided with a cutting edge at one of its ends and being also provided with grappling teeth intermediate its ends for cooperating with said rear grappling teeth on the rear grappling section.

12. In load handling apparatus adapted for mounting on a tractor, said load handling apparatus comprising in combination:
(a) a load handling unit including rear and front load handling sections,
(b) power operated lifting and lowering supporting arm means on which said rear bucket section of the load handling unit is mounted,
(c) power operated tilting means for tilting said section of the load handling unit relatively to said supporting arm means,
(d) said front load handling section being pivotally connected to the rear section for relative opening and closing movements therebetween,
(e) said rear load handling section being in the form of a rear grappling section having spaced side walls provided with front grappling teeth,
(f) said front load handling section being in the form of a single front bucket section having spaced side walls provided with rear grappling teeth,
(g) power operated means for effecting relative opening and closing movement between said front grappling teeth and said rear grappling teeth,
(h) said single front bucket section having an open front and an open rear provided with front and rear cutting edges, and
(i) a swinging closure gate including a wall extending transversely of the space between the sidewalls of said front bucket section and having side portions pivotally connected to said sidewalls of the front bucket section for movement of the gate either into a front closure position for closing the open front of said bucket section or into a rear closure position for closing the open rear of said bucket section, the front and rear ends of said swinging gate being also provided with front and rear cutting edges.

References Cited
UNITED STATES PATENTS

| | | | |
|---|---|---|---|
| 2,326,338 | 8/1943 | Drott et al. | 37—117.5 |
| 2,455,474 | 12/1948 | Drott et al. | 37—117.5 X |
| 2,812,595 | 11/1957 | Drott | 37—117.5 |
| 2,852,869 | 9/1958 | Beyerstedt | 37—117.5 |
| 2,924,345 | 2/1960 | Bodin | 37—117.5 X |
| 3,003,265 | 10/1961 | Lutjens | 37—117.5 X |
| 3,072,257 | 1/1963 | Hockenberry | 37—117.5 X |
| 3,077,999 | 2/1963 | Svoboda | 37—117.5 X |
| 3,148,465 | 9/1964 | Beyerstedt et al. | 37—117.5 |
| 3,195,747 | 7/1965 | Kashergen | 214—145 X |

ABRAHAM G. STONE, Primary Examiner.

R. L. HOLLISTER, Assistant Examiner.